United States Patent
Wang et al.

(10) Patent No.: US 12,223,246 B2
(45) Date of Patent: Feb. 11, 2025

(54) SYSTEMS, METHODS, AND COMPUTER PROGRAM PRODUCTS FOR TRANSISTOR COMPACT MODELING USING ARTIFICIAL NEURAL NETWORKS

(71) Applicant: Samsung Electronics Co., Ltd., Suwon-si (KR)

(72) Inventors: Jing Wang, San Jose, CA (US); Woosung Choi, Milpitas, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 575 days.

(21) Appl. No.: 17/465,361

(22) Filed: Sep. 2, 2021

(65) Prior Publication Data
US 2022/0114317 A1   Apr. 14, 2022

Related U.S. Application Data

(60) Provisional application No. 63/091,067, filed on Oct. 13, 2020.

(51) Int. Cl.
*G06F 30/367* (2020.01)
*G06N 3/08* (2023.01)
*G06F 119/02* (2020.01)

(52) U.S. Cl.
CPC ............ *G06F 30/367* (2020.01); *G06N 3/08* (2013.01); *G06F 2119/02* (2020.01)

(58) Field of Classification Search
CPC .. G06F 30/367; G06F 30/3308; G06F 30/327; G06F 2119/10; G06F 2119/02;

(Continued)

(56) References Cited

U.S. PATENT DOCUMENTS

| 7,567,891 B1 * | 7/2009 | Liu ................. G06F 30/367 703/2 |
| 8,994,617 B2 | 3/2015 | Chaji et al. |

(Continued)

FOREIGN PATENT DOCUMENTS

| CN | 105488589 A * | 4/2016 | ............. G06Q 10/04 |
| CN | 106096106 A * | 11/2016 | ............. G06F 30/00 |

(Continued)

OTHER PUBLICATIONS

A. Huang et al., "A dimension-reduced artificial neural network for the compact modeling of semiconductor devices," IEEE MTT-S International Wireless Symposium (IWS), 2018.

(Continued)

*Primary Examiner* — Jeffrey P Aiello
(74) *Attorney, Agent, or Firm* — Myers Bigel, P.A.

(57) ABSTRACT

A computer implemented method for determining performance of a semiconductor device is provided. The method includes providing training data comprising input state values and training capacitance values to a neural network executing on a computer system; processing the input state values through the neural network to generate modeled charge values; converting the modeled charge values to modeled capacitance values; determining, by the computer system, whether the training capacitance values of the training data are within a threshold value of the modeled capacitance values utilizing a loss function that omits the modeled charge values; and in response to determining that the training capacitance values of the training data are within the threshold value of the modeled capacitance values, converting, by the computer system, the neural network to a circuit simulation code to generate a converted neural network.

20 Claims, 19 Drawing Sheets

(58) Field of Classification Search
CPC .......... G06F 18/21; G06N 3/048; G06N 3/08; G06N 3/084; G06N 3/047; G06N 20/00; H02J 7/0048; H02J 2203/20
USPC ............ 324/658; 700/28, 49, 48, 30, 29, 19; 702/127, 188, 182, 104, 65, 44, 189, 85, 702/1, 35, 117, 64; 703/14, 2, 13

See application file for complete search history.

(56) References Cited

U.S. PATENT DOCUMENTS

| | | | |
|---|---|---|---|
| 10,090,209 | B2 | 10/2018 | Dikshit et al. |
| 10,204,188 | B2 | 2/2019 | Wang et al. |
| 11,635,462 | B2 * | 4/2023 | Lin ...................... G06F 30/3308 702/58 |
| 2014/0244193 | A1 * | 8/2014 | Balasingam ....... G01R 31/3842 702/63 |
| 2017/0271213 | A1 | 9/2017 | Dikshit et al. |
| 2019/0385047 | A1 | 12/2019 | Lei et al. |
| 2020/0151294 | A1 | 5/2020 | Kim |
| 2020/0320366 | A1 | 10/2020 | Wang et al. |

FOREIGN PATENT DOCUMENTS

| | | | | |
|---|---|---|---|---|
| CN | 104467441 | B * | 4/2017 | ............. Y02E 10/56 |
| CN | 110249517 | B * | 5/2021 | ............. G01R 1/203 |

OTHER PUBLICATIONS

A. Paszke et al., "PyTorch: An Imperative Style, High-Performance Deep Learning Library", in Advances in Neural Information Processing Systems 32, H. Wallach et al., ed., Curran Associates, Inc., 2019, pp. 8024-8035.

Gildenblat et al., "PSP: An Advanced Surface-Potential-Based MOSFET Model for Circuit Simulation", in IEEE Trans. Elec. Dev., vol. 53, No. 9, pp. 1979-1993, Sep. 2006.

J. P. Duarte et al., "BSIM-CMG: Standard FinFET compact model for advanced circuit design," 41st European Conference on Solid-State Circuits (ESSCIRC), Sep. 2015, pp. 196-201.

J. Wang, et al, "Artificial Neural Network-Based Compact Modeling Methodology for Advanced Transistors," in IEEE Transactions on Electron Devices, vol. 68, No. 3, pp. 1318-1325, Mar. 2021.

J. Xu et al., "Drain-Source Symmetric Artificial Neural Network-Based FET Model with Robust Extrapolation Beyond Training Data," 2007 IEEE/MTT-S International Microwave Symposium (IMS), pp. 2011-2014, 2007.

J. Xu, et al, "Advances in Artificial Neural Network Models of Active Devices," IEEE MTT-S International Conference on Numerical Electromagnetic and Multiphysics Modeling and Optimization (NEMO), 2015.

Jing Wang et al., "A generic approach for capturing process variations in lookup-table-based FET models", 2015 International Conference on Simulation of Semiconductor Processes and Devices (SISPAD), Washington, DC, Sep. 2015, pp. 309-312.

M. Abadi et al., "Tensorflow: A system for large-scale machine learning," in 12th USENIX Symp. Operating Sys. Des. Implement. (OSDI), Nov. 2016, pp. 265-283.

P. Bendix et al., "RF Distortion Analysis with Compact MOSFET Models," IEEE Custom Integrated Circuit Conference (CICC), 2-2, 2004.

R. A. Thakker, et al., "A Novel Table-Based Approach for Design of FinFET Circuits", IEEE Trans. On Computer-Aided Design of Integrated Circuits and Systems, vol. 28, No. 7, Jul. 2009.

* cited by examiner

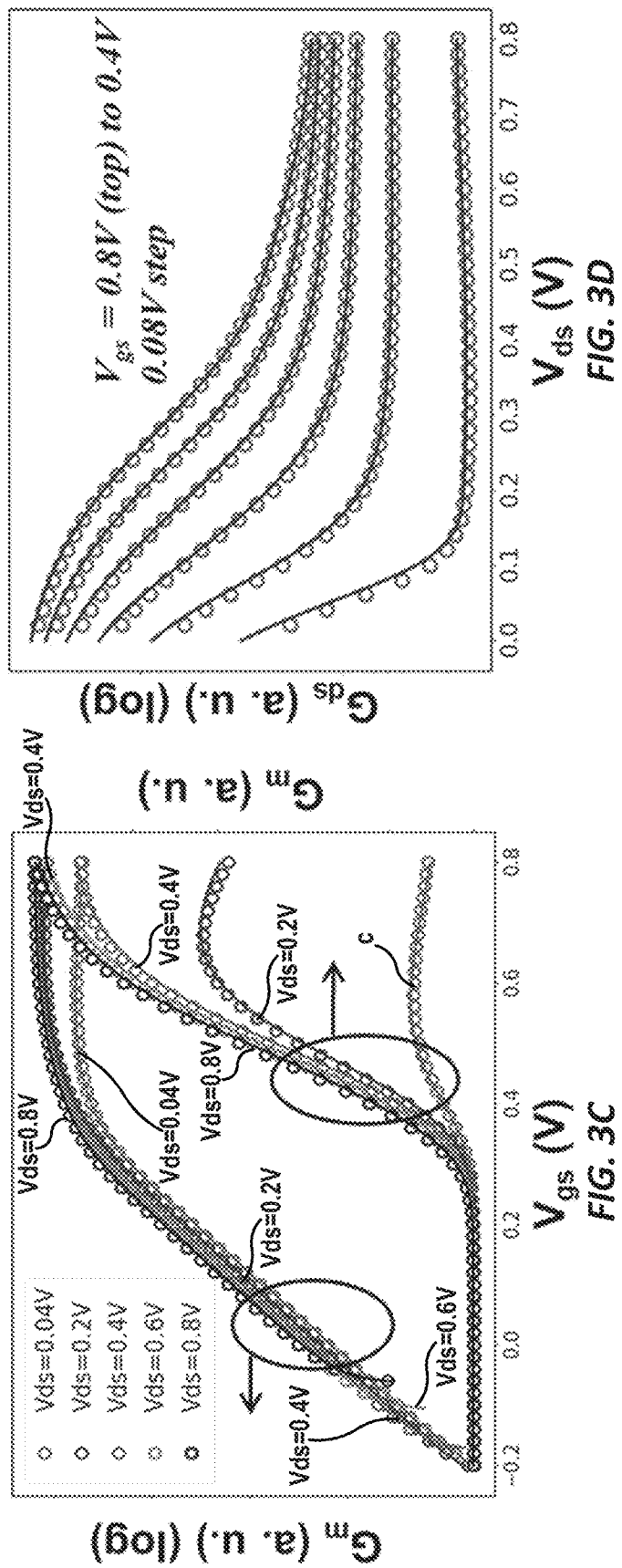

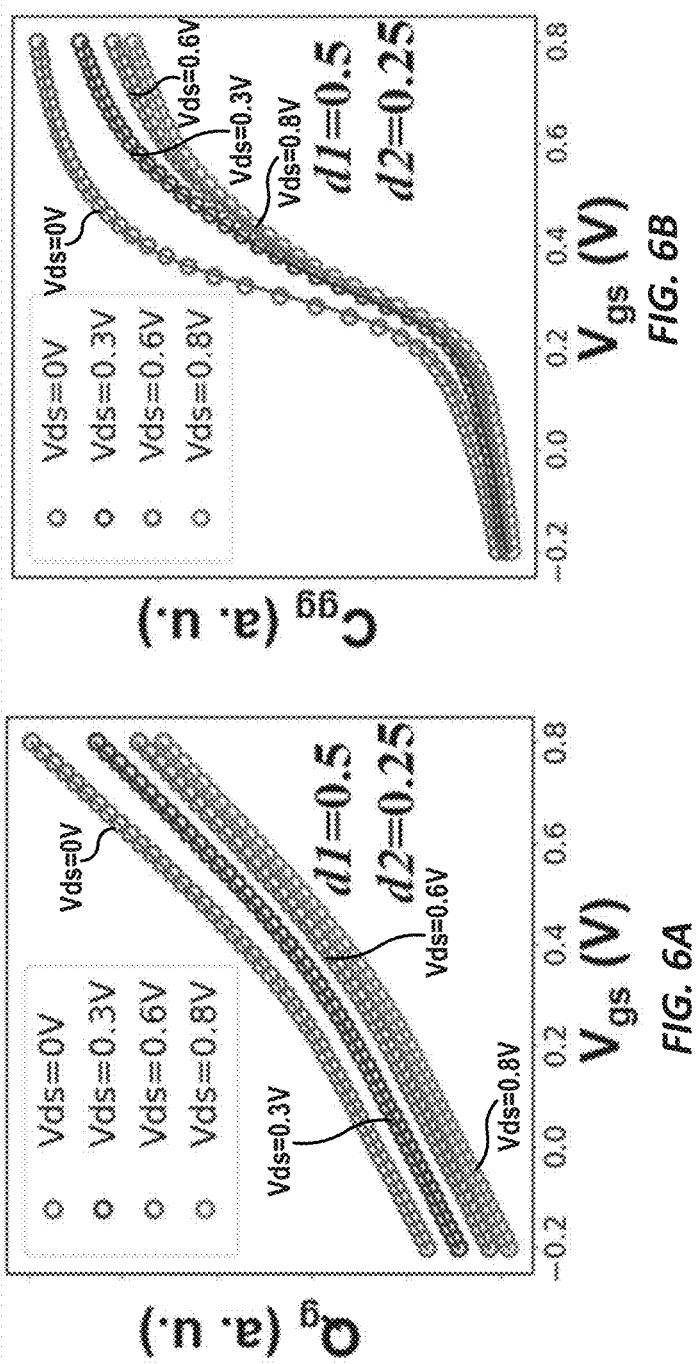

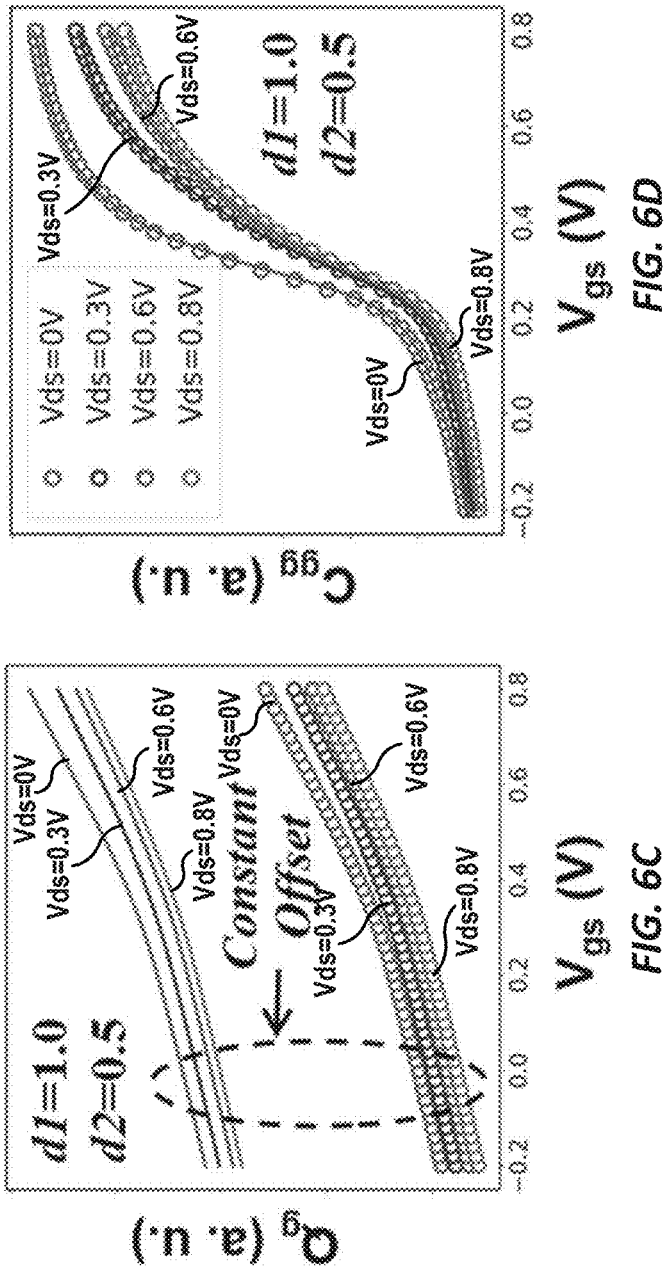

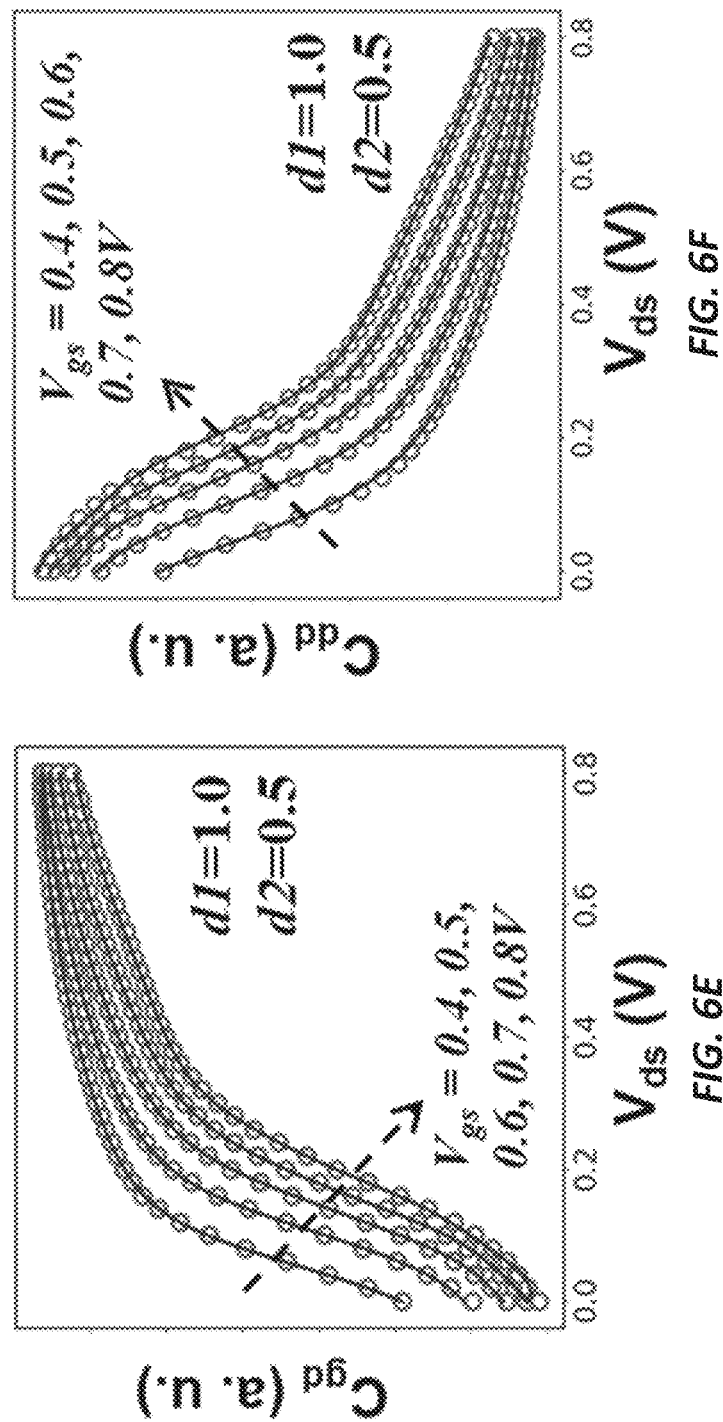

SYSTEMS, METHODS, AND COMPUTER PROGRAM PRODUCTS FOR TRANSISTOR COMPACT MODELING USING ARTIFICIAL NEURAL NETWORKS

CROSS-REFERENCE TO RELATED APPLICATION

The present application claims priority under 35 U.S.C. § 119 to U.S. Provisional Application Ser. No. 63/091,067, filed on Oct. 13, 2020, the entire content of which is incorporated herein by reference as if set forth in its entirety.

FIELD

The inventive concepts generally relate semiconductor devices and systems, methods, and computer program products for designing semiconductor devices and circuits, including modeling the transistors of a circuit.

BACKGROUND

Transistor compact models are useful for circuit simulation, which is often used for efficient analysis and design of integrated circuits (ICs). Standard compact models of Field-Effect Transistors (FETs) are composed of physics-based equations and have been widely adopted in the Process Design Kits (PDKs) for IC product design. Examples of such models include Berkeley Short-channel IGFET Model (BSIM) and Penn State Philips (PSP) model. BSIM is discussed, for example, in J. P. Duarte et al., "BSIM-CMG: Standard FinFET compact model for advanced circuit design," 41st European Conference on Solid-State Circuits (ESSCIRC), September 2015, pp. 196-201. PSP is discussed, for example, in G. Gildenblat et al., "PSP: An Advanced Surface-Potential-Based MOSFET Model for Circuit Simulation," in IEEE Trans. Elec. Dev., vol. 53, no. 9, pp. 1979-1993, September 2006.

As CMOS technology is approaching its scaling limit, various emerging device options need to be assessed during the Design-Technology-Co-Optimization (DTCO) activities with a fast turn-around-time (TAT). In this scenario, the use of standard FET compact models may face two challenges. First, the emerging devices may display electrical characteristics that are not well captured by the standard FET models, and developing the physics-based model equations for the new physical phenomena may involve high expertise and a long TAT. Second, for equation-based models, it is still challenging to fully automate the model parameter extraction process while achieving a very high fitting accuracy.

SUMMARY

Embodiments of the present disclosure relate to compact, neural network (NN) models of semiconductor devices. Some embodiments of the present disclosure relate to NN models that can be generated from C-V (capacitance-voltage) data from a simulation or actual device. Some embodiments of the present disclosure relate to NN models that can improve the inputs to an I-V (current-voltage)-based NN.

Some embodiments of the present inventive concept are directed to a computer implemented method for analyzing performance of a semiconductor device, the method comprising: providing training data comprising input state values and training capacitance values to a neural network executing on a computer system; processing the input state values through the neural network to generate modeled charge values; converting the modeled charge values to modeled capacitance values; determining, by the computer system, whether the training capacitance values of the training data are within a threshold value of the modeled capacitance values utilizing a loss function that omits the modeled charge values; and, in response to determining that the training capacitance values of the training data are within the threshold value of the modeled capacitance values, converting, by the computer system, the neural network to a circuit simulation code to generate a converted neural network.

In some embodiments, the method further comprises, in response to determining that the training capacitance values of the training data are not within the threshold value of the modeled capacitance values, adjusting, by the computer system, a parameter of the neural network and repeating the processing of the input state values through the neural network.

In some embodiments, the method further comprises using the converted neural network to simulate behavior of a test semiconductor device to generate simulation output; determining, by the computer system, whether a turnaround time of the generation of the simulation output is satisfactory; and in response to determining that the turnaround time is not satisfactory, adjusting, by the computer system, a size of the neural network and repeating the processing of the input state values through the neural network.

In some embodiments, the semiconductor device is a transistor.

In some embodiments, the input state values comprise a plurality of bias values and a plurality of instance values, and the computer implemented method further comprises, for each instance value of the plurality of instance values, generating an additional neural network by holding the instance value constant and providing the plurality of bias values to the additional neural network as the input state values for the additional neural network In some embodiments, the method further comprises manufacturing a first instance of the semiconductor device; measuring characteristics and/or performance of the first instance of the semiconductor device; and generating the training data based on the measured characteristics and/or performance of the first instance of the semiconductor device.

In some embodiments, the method further comprises building a hardware description language (HDL) model based on the converted neural network; and manufacturing a second instance of the semiconductor device based on the HDL model.

In some embodiments, converting the modeled charge values to modeled capacitance values comprises generating a mathematical derivative of the modeled charge values.

In some embodiments, the training capacitance values of the training data are generated by a technology computer aided design (TCAD) system simulation.

In some embodiments, providing the training data is performed without performing a mathematical integration of the training capacitance values.

Some embodiments of the present inventive concept are directed to a system for analyzing performance of a semiconductor device, the system comprising: a processor; and a memory. The memory stores computer readable code that, when executed, causes the processor to perform operations comprising: providing training data comprising input state values and training capacitance values to a neural network executing on the processor; processing the input state values through the neural network to generate modeled charge values; converting the modeled charge values to modeled capacitance values; determining, by the processor, whether the training capacitance values of the training data are within a threshold value of the modeled capacitance values utilizing a loss function that omits the modeled charge values; and, in response to determining that the training capacitance values of the training data are within the threshold value of the modeled capacitance values, converting, by the processor, the neural network to a circuit simulation code to generate a converted neural network.

In some embodiments, the operations further comprise, in response to determining that the training capacitance values of the training data are not within the threshold value of the modeled capacitance values, adjusting, by the processor, a parameter of the neural network and repeating the processing of the input state values through the neural network.

In some embodiments, the operations further comprise: using the converted neural network to simulate behavior of a test semiconductor device to generate simulation output; determining, by the processor, whether a turnaround time of the generation of the simulation output is satisfactory; and, in response to determining that the turnaround time is not satisfactory, adjusting, by the processor, a size of the neural network and repeating the processing of the input state values through the neural network.

In some embodiments, the input state values comprise a plurality of bias values and a plurality of instance values, and the operations further comprise, for each instance value of the plurality of instance values, generating an additional neural network by holding the instance value constant and providing the plurality of bias values to the additional neural network as the input state values for the additional neural network.

In some embodiments, the operations further comprise: manufacturing a first instance of the semiconductor device; measuring characteristics and/or performance of the first instance of the semiconductor device; and generating the training data based on the measured characteristics and/or performance of the first instance of the semiconductor device.

In some embodiments, the operations further comprise: building a hardware description language (HDL) model based on the converted neural network; and manufacturing a second instance of the semiconductor device based on the HDL model.

In some embodiments, converting the modeled charge values to modeled capacitance values comprises generating a mathematical derivative of the modeled charge values.

In some embodiments, the training capacitance values of the training data are generated by a technology computer aided design (TCAD) system simulation.

In some embodiments, providing the training data is performed without performing a mathematical integration of the training capacitance values.

Some embodiments of the present inventive concept are directed to a computer program product, comprising: a non-transitory computer readable storage medium storing computer readable program code that, when executed by a processor of an electronic device, causes the processor to perform operations comprising: providing training data comprising input state values and training capacitance values to a neural network executing on the processor; processing the input state values through the neural network to generate modeled charge values; converting the modeled charge values to modeled capacitance values; determining, by the processor, whether the training capacitance values of the training data are within a threshold value of the modeled capacitance values utilizing a loss function that omits the modeled charge values; and, in response to determining that the training capacitance values of the training data are within the threshold value of the modeled capacitance values, converting, by the processor, the neural network to a circuit simulation code to generate a converted neural network.

Some embodiments of the present inventive concept are directed to a computer implemented method for analyzing performance of a transistor, the method comprising: providing training data comprising input state values and output state values to a neural network executing on a computer system, wherein the input state values comprise voltage data of the transistor; adjusting the voltage data to generate smoothed voltage data; training, by the computer system, the neural network based on the training data including the smoothed voltage data to compute a plurality of neural network parameters that relate the input state values of the training data to the output state values of the training data; determining, by the computer system, whether the output state values of the training data match an output of the neural network; and, in response to determining that the output state values of the training data match the output of the neural network, converting, by the computer system, the neural network to a circuit simulation code to generate a converted neural network.

In some embodiments, the voltage data comprise a gate-to-source voltage $V_{gs}$ and a drain-to-source voltage $V_{ds}$, and the smoothed voltage data comprise a smoothed gate-to-source voltage that has a value different than $V_{gs}$ and a smoothed drain-to-source voltage that has a value different than $V_{ds}$.

In some embodiments, the smoothed drain-to-source voltage is generated by the equation:

$$V_{ds\_sm} = \sqrt[s]{V_{ds}^s + \eta^s} - \eta$$

and the smoothed gate-to-source voltage is generated by the equation:

$$V_{gs\_sm} = V_{gs} + \frac{(V_{di\_sm} - V_{ds})}{2},$$

where $V_{ds\_sm}$ is the smoothed drain-to-source voltage, $V_{gs\_sm}$ is the smoothed gate-to-source voltage, s is a first constant that is greater than or equal to 1 and $\eta$ is a second constant that is greater than or equal to 1.

In some embodiments, the method further comprises manufacturing a first instance of the transistor, wherein the training data provided to the neural network is based on characteristics and/or performance of the first instance of the transistor.

In some embodiments, the method further comprises building a hardware description language (HDL) model of the first instance of the transistor based on the converted neural network; and manufacturing a second instance of the transistor based on the HDL model.

In some embodiments, the voltage data of the training data is generated by a technology computer aided design (TCAD) system simulation.

It is noted that aspects of the inventive concepts described with respect to one embodiment, may be incorporated in a different embodiment although not specifically described relative thereto. That is, all embodiments and/or features of any embodiment can be combined in any way and/or combination. These and other objects and/or aspects of the present inventive concepts are explained in detail in the specification set forth below.

BRIEF DESCRIPTION OF THE DRAWINGS

FIGS. 3A, 3B, 3C, and 3D are graphs illustrating the ANN I-V model fitting results for an advanced n-type FET at various bias conditions, computed by a trained neural network according to some embodiments of the present disclosure.

FIGS. 6A, 6B, 6C, 6D, 6E, and 6F are graphs illustrating ANN model results for the Q-V (charge-voltage) and C-V characteristics of an advanced n-type FET, computed by a trained neural network according to some embodiments of the present disclosure.

DETAILED DESCRIPTION

Figure 1A:
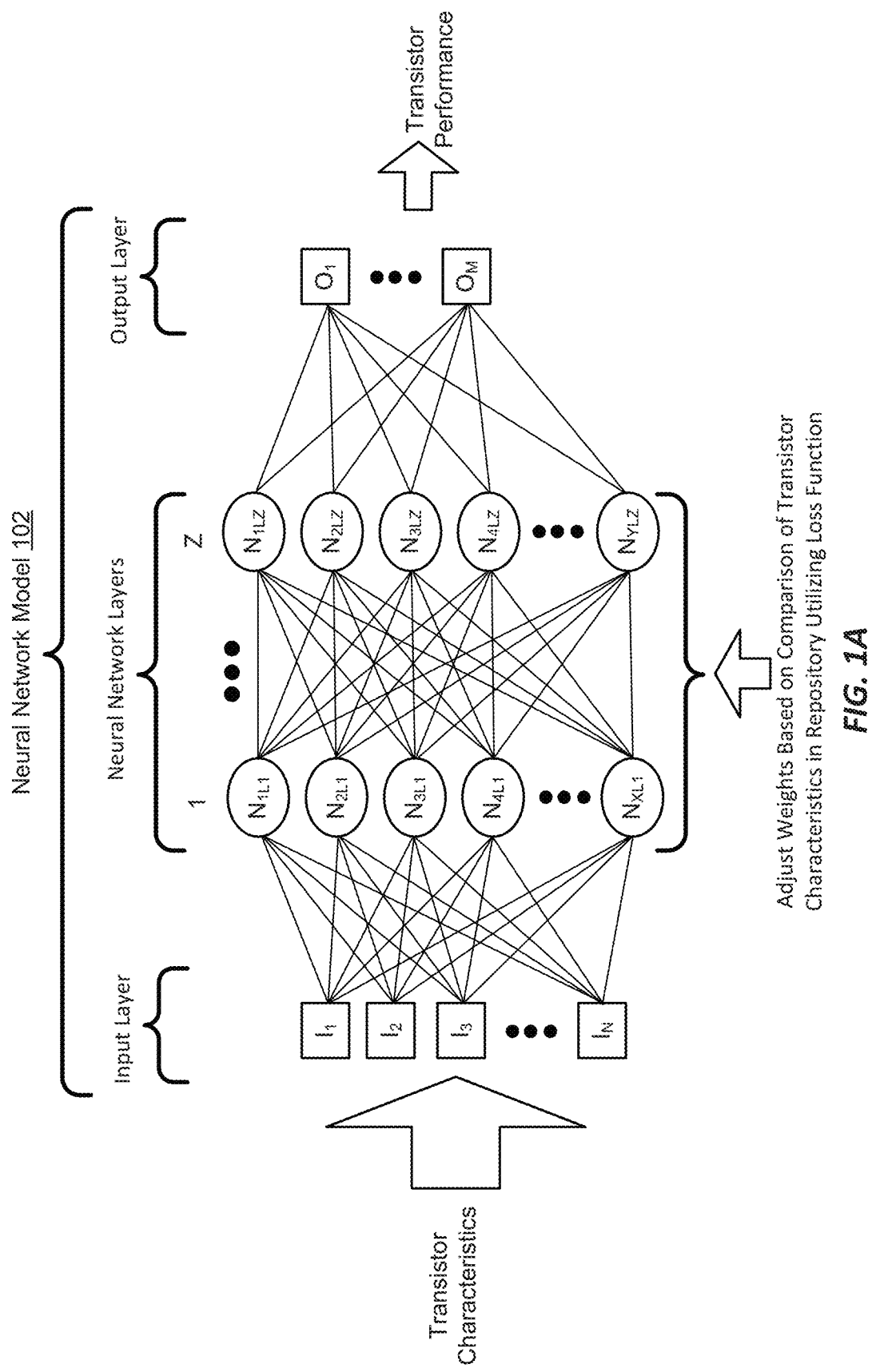
FIG. 1A is a block diagram of a neural network model that can be used in a computer system to model performance of a transistor based on weight values that are adapted using feedback, in accordance with some embodiments of the present disclosure.

In the following detailed description, only certain example embodiments of the present invention are shown and described, by way of illustration. As those skilled in the art would recognize, the invention may be embodied in many different forms and should not be construed as being limited to the embodiments set forth herein.

As noted above, equation-based compact models for semiconductor devices may be inadequate for modelling semiconductor devices. A look-up-table (LUT) based method has been proposed as an alternative to equation-based compact models, as discussed in J. Wang, N. Xu, W. Choi, K.-H. Lee and Y. Park, "A generic approach for capturing process variations in lookup-table-based FET models," 2015 International Conference on Simulation of Semiconductor Processes and Devices (SISPAD), Washington, DC, September 2015, pp. 309-312 and described in U.S. Pat. No. 10,204,188, issued on Feb. 12, 2019, the entire disclosures of which are incorporated by reference herein. However, this method suffers a large Simulation Program with Integrated Circuit Emphasis (SPICE) simulation TAT and convergence issues for large-scale circuits. In addition, a LUT-based model lacks model knobs that can be used to manipulate the output characteristics of the model (e.g., for model re-targeting and variability modeling), which can limit the application of LUT based models for advanced technology evaluation. Also, the LUT model may be based on Q-V (charge-voltage) data of the modeled device. The Q-V data is typically not provided by simulation programs (e.g., from a technology computer aided design (TCAD) system) and may be difficult to obtain from hardware measurement. Instead, the Q-V data may be derived from C-V data, which may be easier to obtain from TCAD systems and/or hardware measurement. For example, the Q-V data may be derived by integrating the measured/simulated capacitance and/or voltage of the device. This is discussed, for example, in R. A. Thakker, et al., "A Novel Table-Based Approach for Design of FinFET Circuits," IEEE Trans. On Computer-Aided Design of Integrated Circuits and Systems, vol. 28, no. 7, July 2009, the entire disclosure of which is incorporated herein by reference. The integrated Q values depend on the integration path in the gate voltage/drain voltage space and, as a result, the Q-V LUT model may suffer inaccuracies due to C-V integration. LUT techniques also typically exhibit high simulation TAT and convergence issues for large-scale circuits. For example, a simulation TAT may be large because the look-up tables may be too large to fit into the cache memory of a computer processor, let alone its registers, and loading the look-up tables from main memory for each circuit element at each step of the simulation can cause significant delays.

Artificial neural network (ANN) based compact modeling methods have recently attracted attention. Disclosed herein are innovative methods that can significantly improve the model quality and the training/simulation TATs of ANN-based compact models.

ANNs have a history of serving as compact models for semiconductor devices, with a particular success in radio frequency (RF) device applications. With the surge of machine learning applications in recent years, high-performance GPU servers and efficient software platforms for ANN training have become widely available to the compact modeling community (e.g., PyTorch, discussed, for example, by A. Paszke et al., "PyTorch: An Imperative Style, High-Performance Deep Learning Library," in Advances in Neural Information Processing Systems 32, H. Wallach et al., ed., Curran Associates, Inc., 2019, pp. 8024-8035, and TensorFlow discussed, for example, by M. Abadi et al., "Tensorflow: A system for large-scale machine learning," in 12th USENIX Symp. Operating Sys. Des. Implement. (OSDI), November 2016, pp. 265-283). For this reason, the potential of the ANN-based methodology for advanced FET modeling may provide additional improvements in device modeling.

The present disclosure relates to an ANN-based compact modeling methodology in the context of advanced FET modeling, including the following aspects: model fitting capability (accuracy), model generation (e.g., ANN training) TAT, and/or SPICE simulation TAT. By introducing a number of useful elements to the ANN-based compact modeling methodology, high model accuracy, fast ANN training TAT and efficient SPICE simulation TAT may be achieved. The results described herein illustrate that the ANN-based compact modeling methodology may find its effective application in advanced technology DTCO and pathfinding activities.

According to some embodiments of the present disclosure, a method that allows training the Q-V (charge-voltage) NN model by directly using C-V (capacitance-voltage) data (e.g., obtained from hardware measurement of a manufactured device or technology computer aided design (TCAD) simulation) is provided. This method may eliminate the inaccuracies in the Q-V model caused by the C-V integration, which may be useful for converting C-V data into Q-V data.

According to some embodiments of the present disclosure, an initial weights setting (IWS) option of using NN weights of a pre-trained NN model as the initial weights for NN model training is provided. By choosing a pre-trained NN model of a device with similar characteristics as the device to be modeled, the IWS option can be used to significantly reduce the training TAT for both I-V (current-voltage) and Q-V NN models.

According to some embodiments of the present disclosure, a local fitting methodology for ANN-based compact models is introduced, which can lead to improvements on both training TAT and simulation TAT for NN models with multiple device instances.

According to some embodiments of the present disclosure, a method of modifying the drain-to-source voltage ($V_{ds}$) and gate-to-source voltage ($V_{gs}$) values before using them as the inputs for the I-V NN model is provided. By doing so, the I-V NN models may provide highly improved results for Gummel symmetry test (GST) and harmonic balance (HB) simulations, which are useful for radio frequency (RF) circuit simulation and design.

At least the following advantages are provided by the embodiments of the present disclosure described herein. According to some embodiments of the present disclosure, it becomes possible to train the Q-V NN model by directly using C-V training data, which reduces and/or eliminates the inaccuracies in the Q-V model caused by the C-V integration. In some embodiments, the training TAT of the NN models may be significantly reduced by using the IWS option and selecting a pre-trained model of a device with similar characteristics as the device to be modeled. In some embodiments, both training TAT and SPICE simulation TAT can be greatly improved for NN models with multiple device instances. In some embodiments, the smoothness of high-order drain-to-source current ($I_{ds}$) derivatives with respect to $V_{ds}$ can be vastly improved around $V_{ds}=0V$, which may lead to significantly better results for GST and HB simulations.

FIG. 1A is a block diagram of a neural network model 102 that can be used in a computer system to model performance of a transistor based on weight values that are adapted using feedback, in accordance with some embodiments of the present disclosure.

Referring to FIG. 1A, the neural network model 102 includes an input layer having a plurality of input nodes $I_1$ to $I_N$, a sequence of neural network layers (layers 1 to Z are illustrated in FIG. 1A) each including a plurality (e.g., 1 to X in FIG. 1A) of weight nodes, and an output layer including at least one output node. In the particular non-limiting example of FIG. 1A, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes a plurality of output nodes O1 to $O_M$ (where M is any plural integer).

The neural network model 102 can be operated to process a plurality of transistor characteristics through different inputs (e.g., input nodes $I_1$ to $I_N$) to generate one or more outputs (e.g., output nodes O1 to $O_M$). The transistor characteristics that can be simultaneously processed through different input nodes $I_1$ to $I_N$ may include, for example, any one or more of voltage biases applied to various inputs of the transistor (or simulated transistor), a gate length L of the transistor (or simulated transistor), a gate width W of the transistor (or simulated transistor), a temperature of operation T, etc. The transistor performance that can be output (e.g., through output nodes $O_1$ to $O_M$) may include charge data, current data, etc.

During operation and/or training of the neural network model 102, the various weights of the neural network layers may be adjusted based on a comparison of predicted transistor performance to data of actual (or simulated) performance. The comparison may be performed, for example, through the use of a loss function. The loss function may provide a mechanism to calculate how poorly the training model is performing by comparing what the model is predicting with the actual value it is supposed to output. The interconnected structure between the input nodes, the weight nodes of the neural network layers, and the output nodes may cause a given transistor characteristic to influence the transistor performance data generated for all of the other transistor characteristics that are simultaneously processed. The transistor performance data generated by the neural network model 102 may thereby identify a comparative prioritization of which of the transistor characteristics provide a higher/lower impact on the transistor performance.

The neural network model 102 of FIG. 1A is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of input values that are to be simultaneously processed, and the number of output nodes can be similarly selected based on the number of output characteristics that are to be simultaneously generated therefrom.

ANN Model Architecture and Results

Figure 1B:
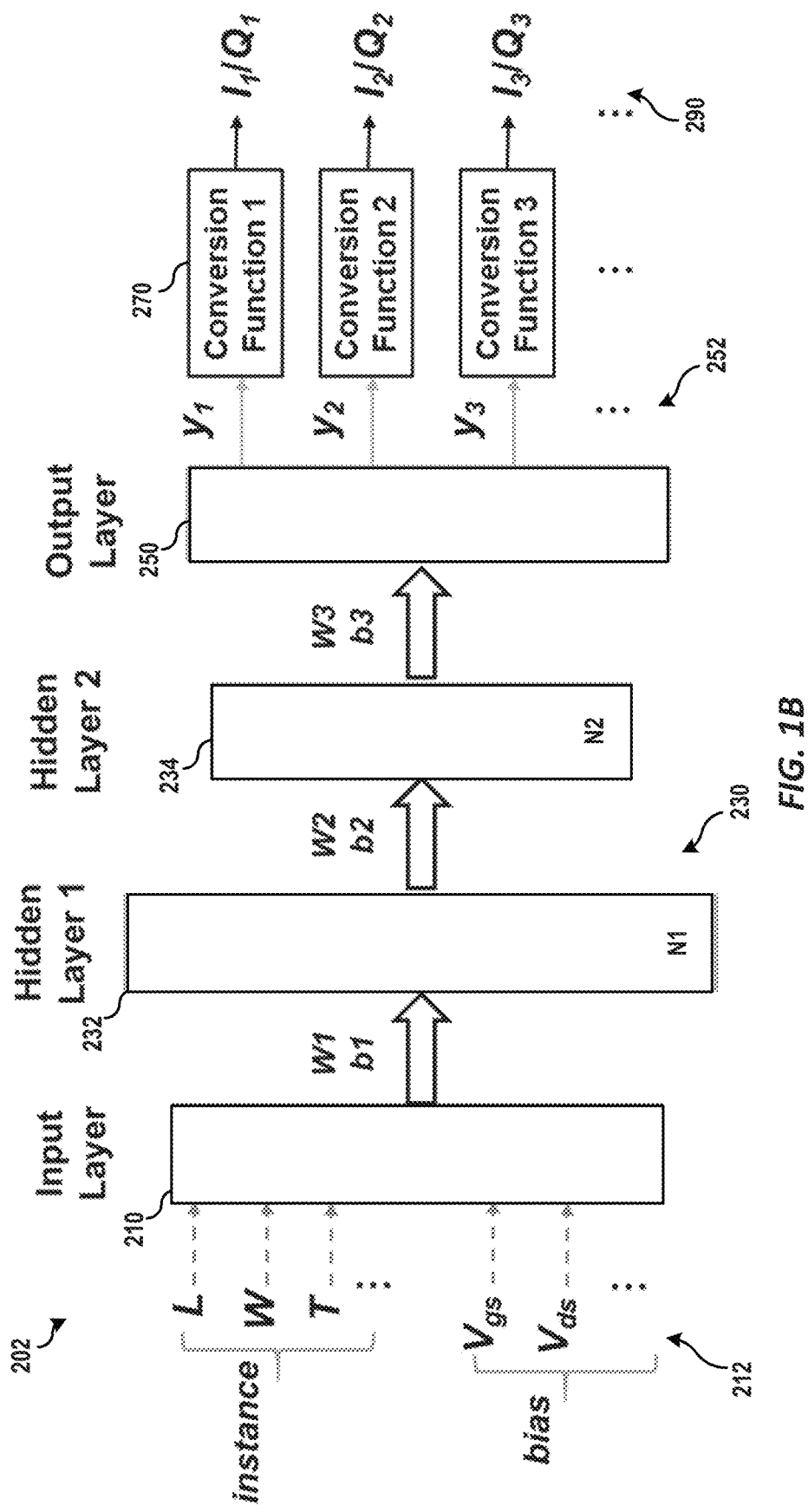
FIG. 1B is a block diagram that illustrates an example of using an ANN as the compact model for an FET, according to some embodiments of the present disclosure.

FIG. 1B is a block diagram that illustrates an example of using an ANN as the compact model for an FET, according to some embodiments of the present disclosure. As shown in FIG. 1B, the neural network 202 includes an input layer 210 configured to receive one or more input parameters 212, one or more hidden layers 230, an output layer 250, and one or more conversion functions 270 configured to compute outputs 290 from the output features 252 of the output layer 250. Generally, the neural network 202 takes input parameters corresponding to a state of the transistor (e.g., voltage biases applied to the terminals of the transistor) and generates outputs representing the behavior of the transistor in the current state (e.g., output currents and charges).

In some embodiments, the input parameters 212 include two types: voltage biases (e.g., for a 4-terminal FET, this includes a gate-source voltage $V_{gs}$, a drain-source voltage $V_{ds}$, and a body-source voltage Vs) and device instance parameters (for a typical FET, this includes gate length L, FET width W, temperature T, etc.).

In the particular example neural network shown in FIG. 1B, the input parameters 212 to the neural network include transistor input state values including a gate-source voltage $V_{gs}$, a drain-source voltage $V_{ds}$, a gate length L, a gate width W, and a temperature T, and the outputs include transistor output state values including ratios of the terminal current $I_M$ (e.g., $I_1$, $I_2$, etc.) and terminal charge QM. (e.g., $Q_1$, $Q_2$, etc.).

Other transistor state values that may be provided to the neural network 202 and utilized in processing the model also include capacitance data associated with the input parameters 212, such as the capacitance at the gate with respect to the voltage applied to the gate ($C_{gg}$), the capacitance at the gate with respect to the voltage applied to the drain ($C_{gd}$), the capacitance at the drain with respect to the voltage applied to the gate ($C_{dg}$), the capacitance at the drain with respect to the voltage applied to the drain ($C_{dd}$), the capacitance at the source with respect to the voltage applied to the gate ($C_{sg}$), and the capacitance at the source with respect to the voltage applied to the drain ($C_{sd}$). The capacitance data may be provided as part of training data made available during training of the neural network 202.

In addition, the hidden layers 230 of the neural network 202 shown in FIG. 1B include two layers: a first hidden layer 232 having N1 neurons and a second hidden layer 234 having N2 neurons.

According to some embodiments of the present disclosure, the values from a layer are mapped to values of a next layer, in a fully connected manner, based on an affine transformation of the form Wx+b. For example, the input parameters to the input layer 210 are mapped to the first hidden layer 232 by first weights W1 and first biases b1. Similarly, the outputs of the first hidden layer 232 are mapped to inputs of the second hidden layer 234 by second weights W2 and second biases b2, and the outputs of the second hidden layer 234 are mapped to output layer 250 by third weights W3 and third biases b3. In some embodiments of the present disclosure, an activation function is placed between the output of the affine function Wx+b and the input of the next layer. Examples of activation functions include the rectified linear (ReLU) function, a sigmoid function, and the like. The particular choice of activation function used between layers may be set as an ANN setting (e.g., a hyper-parameter) of the neural network 202.

A neural network may be more easily trained when the values propagated between the layers are normally distributed with means near zero. Accordingly, the output features 252 ($y_1$, $y_2$, $y_3$, ...) of the neural network corresponding to particular predicted characteristics of the modeled circuit element may not match up with the units of the physical parameters that they model. In addition, some of the output values may be computed based, in part, on particular input parameters 212. Therefore, the output features or feature vector 252 ($y_1$, $y_2$, $y_3$, ...) of the neural network 202 are converted by conversion functions 270 into physically meaningful values (e.g., terminal current $I_M$, terminal charge $Q_M$, or a ratio of the two $I_M/Q_M$) representing the behavior of the transistor. Other example outputs include a drain current $I_d$, gate current $I_g$, source current $I_s$, drain charge $Q_d$, gate charge $Q_g$, source charge $Q_s$, and body charge $Q_b$.

The particular structure of a neural network 202 may be specified through a number of ANN settings (e.g., hyper-parameters), including the number of hidden layers 230, the number of neurons in each of those hidden layers (each hidden layer may have a different number of neurons), and/or the choice of activation function between the output of the affine computations and the input of the following layer. The particular choice of ANN settings suitable for a network may vary based on, for example, the complexity of the physical characteristics of the transistor being modeled.

The neurons of the input layer 210 are for voltage biases applied to the FET terminals and the instance parameters (e.g., L, W, T). The number of hidden layers 230 (i.e., fully connected) in the ANN and the number of neurons in each hidden layer are ANN settings that can be tuned to achieve the optimum model accuracy and SPICE simulation TAT (to be discussed in further detail herein). Each neuron in the output layer 250 may correspond to a terminal current I or a terminal charge Q. As some terminal currents or charges may vary by many orders of magnitude during the FET operation, a conversion function 270 may be introduced to improve the ANN model fitting accuracy.

In FIG. 1B, two hidden layers 232, 234 are illustrated, but the embodiments of the present disclosure are not limited thereto. In some embodiments, the number of hidden layers 230 may be adjustable. The numbers of neurons in the first and second hidden layers 232, 234 are denoted as N1 and N2, respectively. $W_i$ and $b_i$ (i=1, 2, 3) denote the ANN weights (in the double-precision, floating-point format), and the output features 252 of the ANN (e.g., $y_1$, $y_2$, $y_3$, ...) may be converted into a terminal current I or a terminal charge Q by using a conversion function 270.

As such, some aspects of embodiments of the present disclosure relate to a system, method, and/or computer program product for simulating a circuit element such as a transistor from C-V data.

Automated Flow for Generating an Improved ANN Model

Figure 2A:
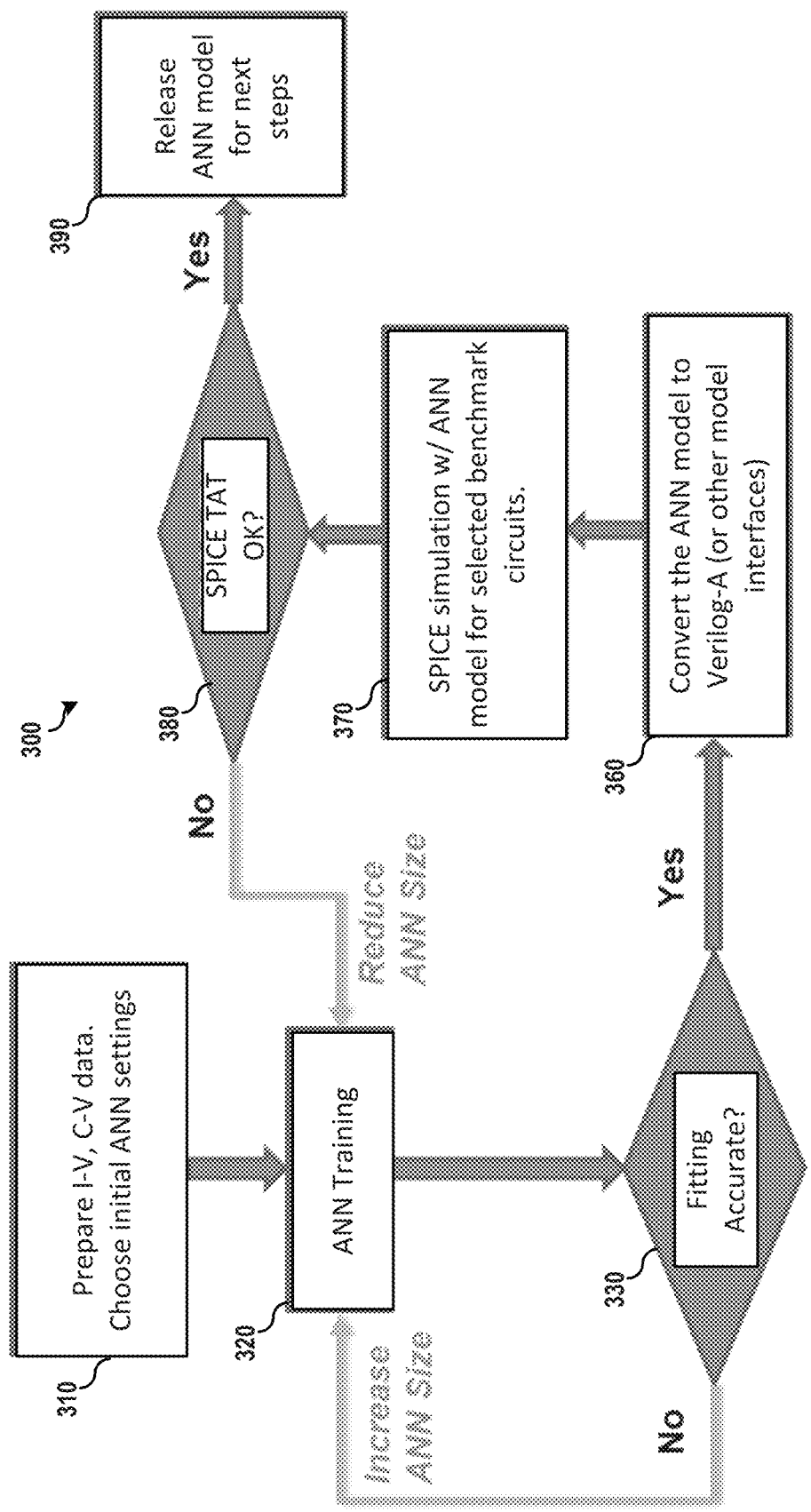
FIG. 2A is a flowchart of a method for generating an ANN model according to some embodiments of the present disclosure.

FIG. 2A is a flowchart of a method 300 for generating an ANN model according to some embodiments of the present disclosure. The various operations of the method shown in FIG. 2A may be performed by a computing system including at least one processor and a memory storing instructions that, when executed by the processor, cause the processor to perform the operations described. Embodiments of the present invention may be implemented in a variety of different computing systems, such as single computers and computing clusters. The computing system may include one or more processors such as central processing units (CPUs), graphics processing units (GPUs), and other vector processing units. The computing systems may also include multiple types of memory, including multiple levels of cache memory located on the same die as a processing core of a processor, dynamic random access memory (DRAM), and persistent mass storage devices (e.g., solid state flash drives and hard disk drives).

In operation 310, the computing system prepares I-V and/or C-V training data received regarding the transistor to be modeled. These training data may be generated from a transistor simulation tool such as the Synopsys® TCAD tool or may be experimentally measured from one or more fabricated physical devices (e.g., preliminary data from early prototypes of devices). Preparation of the data may include cleaning the data and arranging the data into a format acceptable for a neural network training platform such as Google® TensorFlow® or PyTorch. The preparation of the data may also include separating the data into a training set, a validation set, and a test set. In addition, in operation 310, initial ANN settings (e.g., number of hidden layers, number of neurons in each hidden layer, and the like) for the neural network may be set. In some embodiments, the ANN settings may be automatically set, e.g., based on a set of defaults or set to random values within particular ranges. In some embodiments, as will be discussed further herein, the ANN settings may be set based on prior trained ANN models.

The C-V data may include, for example, $C_{gg}$, $C_{gd}$, $C_{dg}$, $C_{dd}$, $C_{sg}$, $C_{sd}$. As will be discussed further herein, there is a mathematical relationship between the capacitance data and the charge data. For example, $C_{gg}$ equals the derivative of the charge at the gate terminal with respect to the gate voltage ($dQ_g/dV_g$), $C_{gd}$ equals the derivative of the charge at the gate terminal with respect to the drain voltage ($dQ_g/dV_d$), $C_{dg}$ equals the derivative of the charge at the drain terminal with respect to the gate voltage ($dQ_d/dV_g$), $C_{dd}$ equals the derivative of the charge at the drain terminal with respect to the drain voltage ($dQ_d/dV_d$), $C_{sg}$ equals the derivative of the charge at the source terminal with respect to the gate voltage ($dQ_s/dV_g$), and $C_{sd}$ equals the derivative of the charge at the source terminal with respect to the drain voltage ($dQ_s/dV_d$).

In operation 320, the computing system trains a neural network model of the transistor based on the supplied training data (e.g., the C-V data). The training may be performed automatically by the neural network training platform (such as Google® TensorFlow® or PyTorch), where a technique such as backpropagation is used to compute the weights W and biases b (e.g., W1, W2, and W2 and b1, b2, and b3 depicted in FIG. 1B) of the neural network, such that the model maps the input parameters 212 to the outputs 290 in a manner consistent with the training set of the data.

In order to achieve high ANN model accuracy, it is important to define a proper loss function for ANN training. An example loss function may be as follows:

$$\text{loss}(M) = \frac{1}{N_S} \sum_{i=1}^{N_S} \left[ (1-d1) \cdot err(M^{(i)}) + (d1-d2) \cdot err\left(\frac{dM^{(i)}}{dV_{gs}}\right) + d2 \cdot err\left(\frac{dM^{(i)}}{dV_{ds}}\right) \right].$$

(Equation 1)

In Equation 1, M represents a terminal current or a terminal charge of the modeled device (e.g., drain current $I_d$, gate charge $Q_g$, drain charge $Q_d$, or source charge Qs), $N_S$ is the number of training samples, i denotes the $i^{th}$ training sample, d1 and d2 ($0 \le d2 \le d1 \le 1$) are weights used to indicate the importance of the derivatives of M with respect to $V_{gs}$ and $V_{ds}$ for model fitting, and err( ) refers to the formula for calculating the relative fitting error of the model value with respect to the target. If one ANN model is used to fit multiple terminal currents and/or charges, the total loss function used for the ANN training should be a sum of all relevant loss(M) functions.

For example, if $Q_g$ is being modeled, the loss function may match the equation:

$$\text{loss}(Qg) = (1-d1) \cdot \text{error}(Qg) + (d1-d2) \cdot \text{error}\left(\frac{dQg}{dVg}\right) + d2 \cdot \text{error}\left(\frac{dQg}{dVd}\right)$$

To map to only C-V data, d1 may be set to 1, which results in the equation:

$$\text{loss}(Qg) = (1-d2) \cdot \text{error}(Cgg) + d2 \cdot \text{error}(Cgd)$$

Similar equations may be used for other terminal charges (e.g., $Q_d$ or $Q_s$). To generate the error( ) terms, the modeled charge outputs from the ANN model may be compared to the capacitance values provided as part of the training data. For example, derivatives may be taken of the modeled charge values (e.g., $Q_g$, $Q_d$ and/or $Q_s$) to generate modeled capacitance values (e.g., $C_{gg}$, $C_{gd}$, $C_{dg}$, $C_{dd}$, $C_{sg}$, and/or $C_{sd}$) from the modeled charge values. The modeled capacitance values may be compared to the training data capacitance values to generate the error( ) terms of the loss function.

By setting d1 to one in the loss equation, a generation or an error( ) term for the charge terminal itself, e.g., error(Qn), is not necessary. In some modeling systems, generating this error( ) term may involve comparison between the modeled charge value (e.g., $Q_g$, $Q_d$ and/or $Q_s$) and training data including target charge values. In such systems, providing the training data including target charge values may include performing an integration of target capacitance values taken from simulations and/or system measurements. Such an integration may introduce inaccuracies into the loss function. Some embodiments of the present disclosure avoid these inaccuracies by excluding the comparison of the charge values from the loss function. Thus, in some embodiments of the present disclosure, the training of the neural network is performed without performing a mathematical integration of the capacitance data.

Figure 2B:
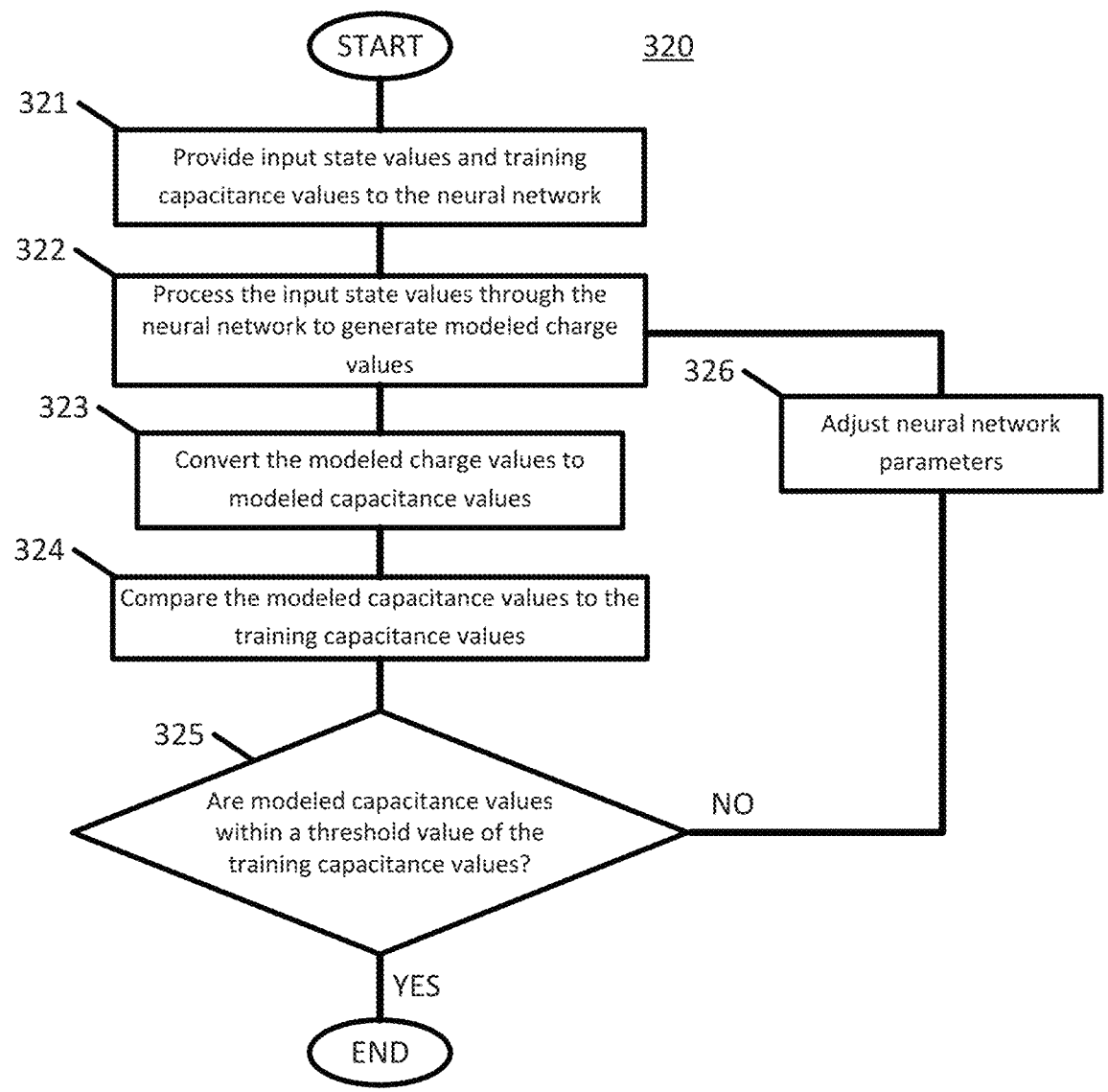
FIG. 2B is a flowchart of a method for training an ANN model according to some embodiments of the present disclosure.

FIG. 2B is a flowchart illustrating an example embodiment of operation 320 for training an ANN model according to some embodiments of the present disclosure. Referring to FIG. 2B, in operation 321 input state values and training capacitance values may be provided to the neural network. The input state values and the training capacitance values may be the same as or similar to those prepared in operation 310 of the process illustrated in FIG. 2A. The training capacitance values may include capacitance values generated from TCAD simulations and/or hardware measurements.

In operation 322, the input state values (e.g., voltage biases such as $V_{gs}$, $V_{ds}$, and/or $V_{bs}$ and/or device instance parameters such as L, W, and/or T) may be processed by the neural network to generate modeled charge values (e.g., $Q_g$, $Q_d$ and/or $Q_s$). The input state values may be processed through the plurality of neural network layers according to the weights associated with the neural network layers.

In operation 323, the modeled charge values (e.g., $Q_g$, $Q_d$ and/or $Q_s$) may be converted to modeled capacitance values. For example, converting the modeled charge values may involve taking one or more derivatives of the modeled charge values to generate the modeled capacitance values (e.g., $C_{gg}$, $C_{gd}$, $C_{dg}$, $C_{dd}$, $C_{sg}$, and/or $C_{sd}$) from the modeled charge values.

In operation 324, the modeled capacitance values may be compared to the capacitance values from the training data. The comparison may be performed, for example, by a loss function such as one of the loss functions described herein. The loss function may include the capacitance values but may omit and/or exclude the modeled charge values. Thus, the comparison may be performed free of the charge values.

In operation 325, the results of the comparison between the modeled capacitance values and the training capacitance values may be compared to a threshold value. The comparison may be performed, for example, utilizing a loss function, such as the loss function equation discussed herein. In some embodiments, the loss function may be configured to be free of and/or omit a charge value from the loss function. For example, the loss function may utilize the modeled capacitance values rather than the modeled charge values. If the results of the comparison are within a threshold value, the training of the neural network may end. If the results of the comparison are not within the threshold value, the parameters of the neural network (e.g., weights of the neural network layers) may be adjusted in operation 326 and operation 322 (the generation of the modeled charge values from the input state values) may be repeated.

Referring back to FIG. 2A, in operation 330, the computing system determines whether the fit (e.g., a fitting value) between the model and the supplied data is accurate (e.g., exceeds a threshold level). Typically, this evaluation is performed by using the training set and the validation set of the supplied data. In the event that the fit between the model and the training/validation sets is not accurate (e.g., below a threshold accuracy level), then the computing system may adjust (e.g., increase) the size of the ANN. In particular, under this condition (330:No in FIG. 2A), the computer system may increase the number of hidden layers and/or increase the number of neurons in each hidden layer under the assumption that the previously trained model failed to fit the data because it did not have enough dimensions to model the complexity of the underlying physical dynamics of the transistor. The computing system then returns to operation 320 to train a new neural network based on the new ANN settings.

In some embodiments, the fitting accuracy of operation 330 is performed automatically based on functionality integrated into the model training platform. In some embodiments, the fitting error is calculated as the root-sum-squared of the relative errors of the model value with respect to the target value for each training sample. The fitting criterion is determined by the requirements of the application cases of the transistor model (e.g., in some embodiments, a criterion of <1% error is used for both I-V and Q-V fitting of a transistor).

If the fitting was found to be sufficiently accurate in operation 330, then in operation 360, the computing system converts the trained neural network model into circuit simulation code such as the Verilog-A hardware description language (HDL) or Common Model Interface (CMI) for use with the Cadence® Spectre® Circuit Simulator. In some embodiments, the parameters of the trained neural network (the weights W and biases b for each layer) are copied into a source code file (e.g., Verilog-A file) as internal variables in a representation appropriate to the programming language of the simulator. A corresponding set of equations implementing the neural network are written in a source code file (e.g., a Verilog-A file) to perform the neural network calculations (e.g., matrix multiplication and activation functions such as sigmoid) in accordance with the stored parameters. (The parameters may be stored in the same file as the equations or in a different file from the equations.) The resulting model, implemented in the programming language of the simulator, takes the inputs such as voltage biases and device instance parameters from the circuit simulator, performs internal computation based on the neural network parameters, and outputs, e.g., the terminal currents and charges of the device to the circuit simulator.

The size of the model, in terms of number of neural network parameters, is significantly smaller than the size of a lookup table (LUT). Accordingly, the converted neural network model is more compact than corresponding LUT based techniques for modeling a transistor. Furthermore, the more compact size of a neural network-based model according to embodiments of the present invention allows the neural network-based model to fit, for example, into a processor level cache of a processor and/or in one or more vector registers of a processor, thereby allowing faster computation of predicted transistor outputs based on the model, without traversing multiple levels of the memory hierarchy of a computer system.

In operation 370, the computing system runs a simulation (e.g., a SPICE simulation) of a circuit, where the simulation uses the converted neural network model to simulate the behavior of at least one element of the circuit. For example, in the case where there are multiple circuit elements of the same type (e.g., multiple transistors of the same type), the simulator may simulate the behavior of each of the circuit elements (e.g., transistors) using the same neural network model. In addition, the simulation may include other neural network models simulating the behavior of other circuit elements (e.g., transistors of different types). Running the simulation of the electrical circuit may include supplying simulated input voltage and/or current waveforms to one part of the circuit and computing simulation results, which include voltages and/or currents in other parts of the circuit.

In operation 380, the computing system determines whether the results are satisfactory (e.g., if the simulation TAT of the benchmark circuits is below a criterion provided by the model users). If not, then the computing system returns to operation 320 to adjust the ANN settings (e.g., the ANN hyper-parameters). In particular, under this condition (380:No in FIG. 2A), the computer system may decrease the number of hidden layers and/or the number of neurons in each hidden layer under the assumption that the complexity of the previously trained model should be reduced (e.g., regularized) in order to improve simulation TAT. If the results are satisfactory, then, in operation 390, the trained model may then be released (e.g., output) for deployment or for further processing according to other aspects of embodiments of the present disclosure. For example, the trained model may be used as part of a validation process as part of the manufacturing of additional semiconductor devices, such as those including transistors.

As will be discussed further herein, when adjusting the ANN size, there is a tradeoff between ANN model accuracy and SPICE simulation TAT. Therefore, it is highly beneficial to develop an automated flow to decide the optimum ANN configuration for each modeling task. FIG. 2A illustrates such a flow, which includes initial data preparation and ANN setup (operation 310), ANN training (operation 320), model accuracy/quality check (operation 330), model converting (e.g., to Verilog-A) (operation 360), SPICE (or other simulation) validation (operation 370) and TAT verification (operation 380). During this process, the ANN size is increased if the model accuracy is unsatisfactory, and it is reduced if the SPICE simulation TATs do not meet the model users' expectation. Using this automated flow, an improved ANN model with a good balance of model accuracy and TAT can be obtained, which is important for accurate and efficient SPICE simulations.

ANN Model for FET I-V Characteristics

Figure 3A:
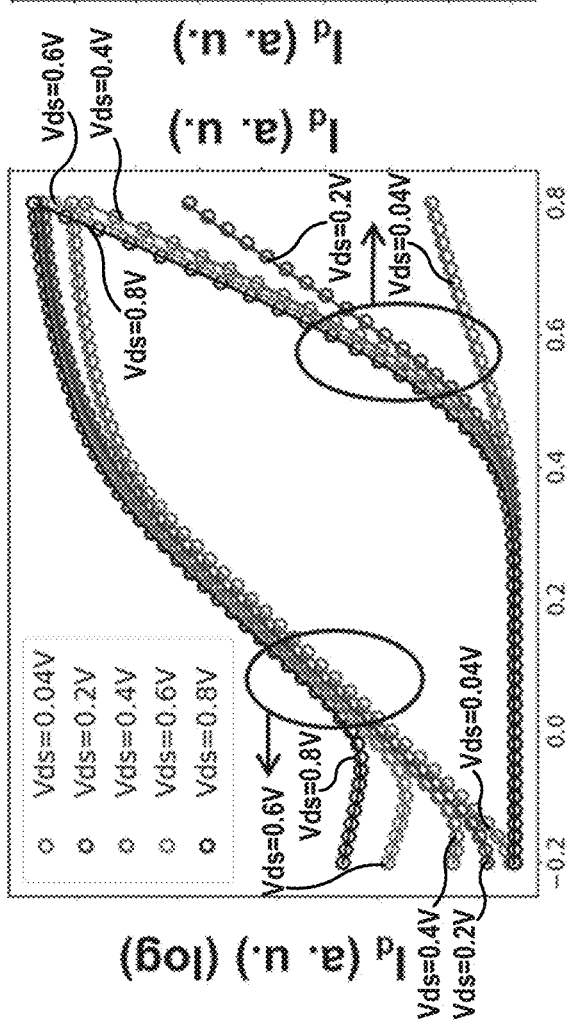
Figure 3B:
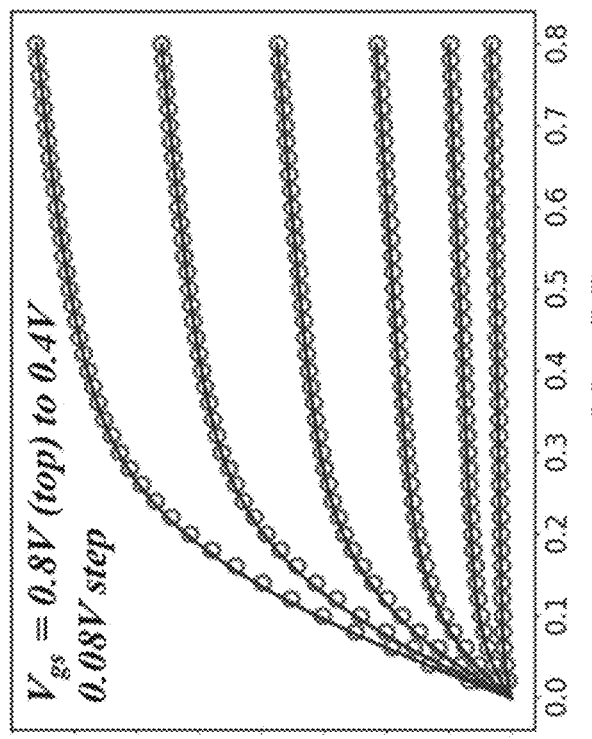

FIGS. 3A, 3B, 3C, and 3D are graphs illustrating the ANN I-V model fitting results for an advanced n-type FET at various bias conditions, computed by a trained neural network according to some embodiments of the present disclosure. FIGS. 3A to 3D illustrate ANN model results vs. targets for an advanced n-type FET. FIG. 3A is a graph of $I_d$ vs. $V_{gs}$, according to some embodiments of the present disclosure. FIG. 3B is a graph of $I_d$ vs. $V_{ds}$, according to some embodiments of the present disclosure. FIG. 3C is a graph of transconductance Gm vs. $V_{gs}$, according to some embodiments of the present disclosure. FIG. 3D is a graph of $G_{ds}$ vs. $V_{ds}$. The target data are shown by circles and the curves computed by the trained neural network according to some embodiments of the present disclosure are shown as lines of corresponding shade. FIGS. 3A to 3D show that high model accuracy has been achieved for the drain current $I_d$ as well as its derivatives with respect to $V_{gs}$ and $V_{ds}$ (i.e., $G_m$ and $G_{ds}$).

For example, FIG. 3A illustrates that $I_d$ vs. $V_{gs}$ as predicted by the trained neural network utilizing C-V data tracks very closely to the targets for $V_{ds}$ values of 0.04V, 0.2V, 0.4V, 0.6V, and 0.8V, with the graph illustrating both a log and linear scale. Similarly, FIG. 3B illustrates that $I_d$ vs. $V_{ds}$ as predicted by the trained neural network utilizing C-V data tracks very closely to the targets for $V_{gs}$ values from 0.8V to 0.4V in 0.08V steps (e.g., 0.4V, 0.48V, 0.56V, 0.64V, 0.72V and 0.8V). FIG. 3C illustrates that transconductance $G_m$ vs. $V_{gs}$ as predicted by the trained neural network utilizing C-V data tracks very closely to the targets for $V_{ds}$ values of 0.04V, 0.2V, 0.4V, 0.6V, and 0.8V (shown in both log and linear scale). FIG. 3D illustrates that $G_{ds}$ (log scale) vs. $V_{ds}$ as predicted by the trained neural network utilizing C-V data tracks very closely to the targets for $V_{gs}$ values from 0.8V to 0.4V in 0.08V steps (e.g., 0.4V, 0.48V, 0.56V, 0.64V, 0.72V and 0.8V).

The selection of the conversion function is important for achieving high I-V model accuracy. In this case, the following conversion function is used for the channel (drain-to-source) current, $$I_{ds} = I_0 \cdot V_{ds} \cdot 10^y. \quad \text{(Equation 2)}$$

In Equation 2, $I_0$ is a normalization factor (e.g., 1 pA/V), and y is the output from the corresponding neuron in the ANN output layer (see FIG. 1B). This conversion function guarantees a zero $I_{ds}$ when $V_{ds}$=0V, and limits the range of y even when $I_{ds}$ varies by many orders of magnitude during the FET operation. (For simplicity, the gate leakage currents and the substrate currents of the FET are not included. Therefore, the drain current, $I_d$, equals to the channel current, $I_{ds}$.)

If the ANN FET model is to be used in RF distortion simulations, it may be useful to ensure the I-V model passes the Gummel Symmetry Test (GST) at $V_{ds}$=0V. Embodiments of the present disclosure propose the following voltage smoothing functions for $V_{ds}$ and $V_{gs}$, respectively, $$V_{ds\_sm} = \sqrt[\epsilon]{V_{ds}^\epsilon + \eta^\epsilon} - \eta \quad \text{(Equation 3)}$$

$$V_{gs\_sm} = V_{gs} + (V_{ds\_sm} - V_{ds})/2. \quad \text{(Equation 4)}$$

In Equation 3, $\epsilon$ and $\eta$ are constants (i.e., $\epsilon \geq 1$ and $\eta \geq 0$), and the modified voltage biases (i.e., $V_{ds\_sm}$ and $V_{gs\_sm}$) are used as the inputs of the ANN model. Following the convention in the standard FET models, when the FET is in the reverse mode (i.e., $V_{ds}$<0 for NFET, $V_{ds}$>0 for PFET), the source terminal and the drain terminal of the FET are swapped for the voltage bias calculation.

Figure 4A:
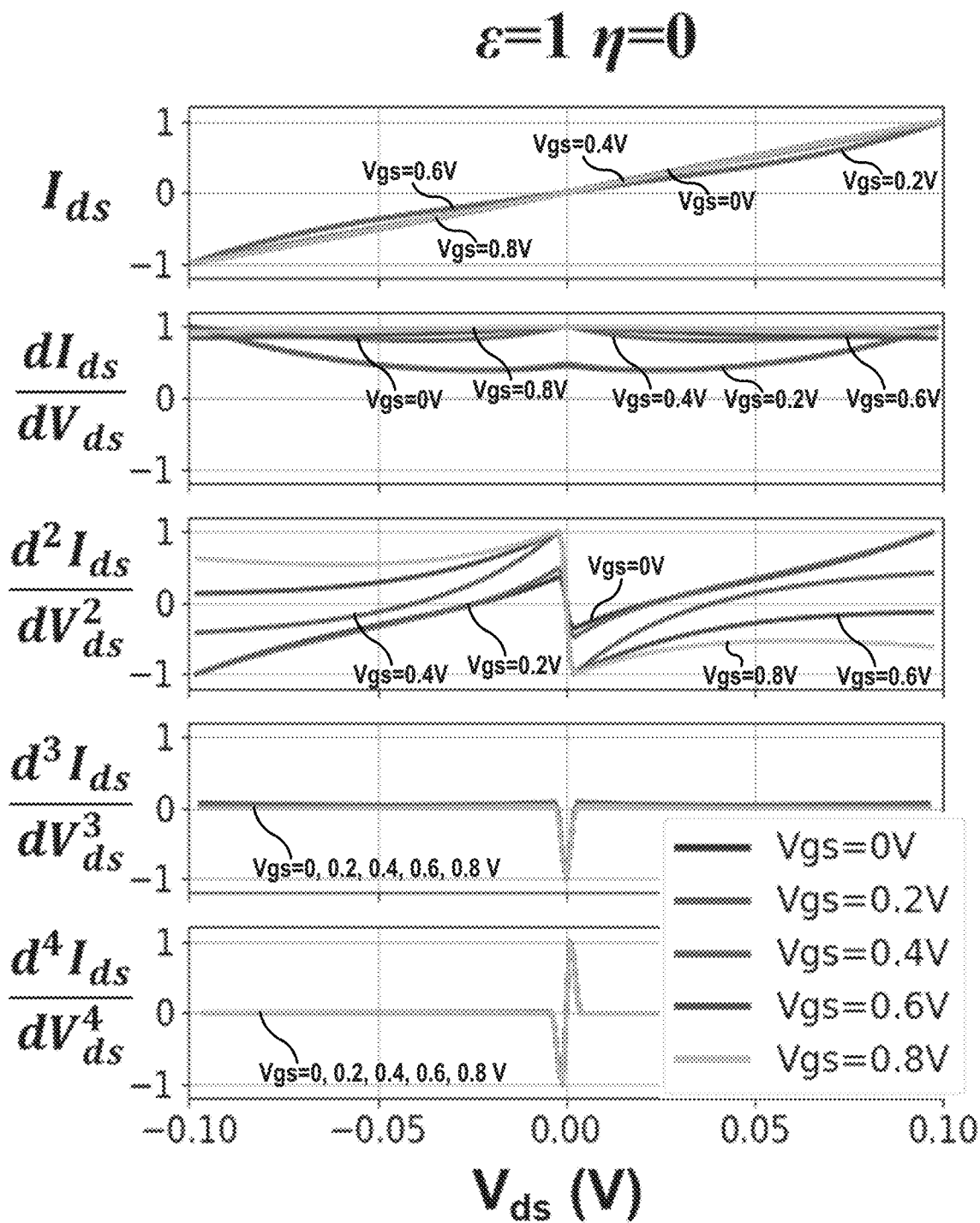
FIGS. 4A and 4B are graphs illustrating the results for the ANN I-V model, computed by a trained neural network according to some embodiments of the present disclosure.
Figure 4B:
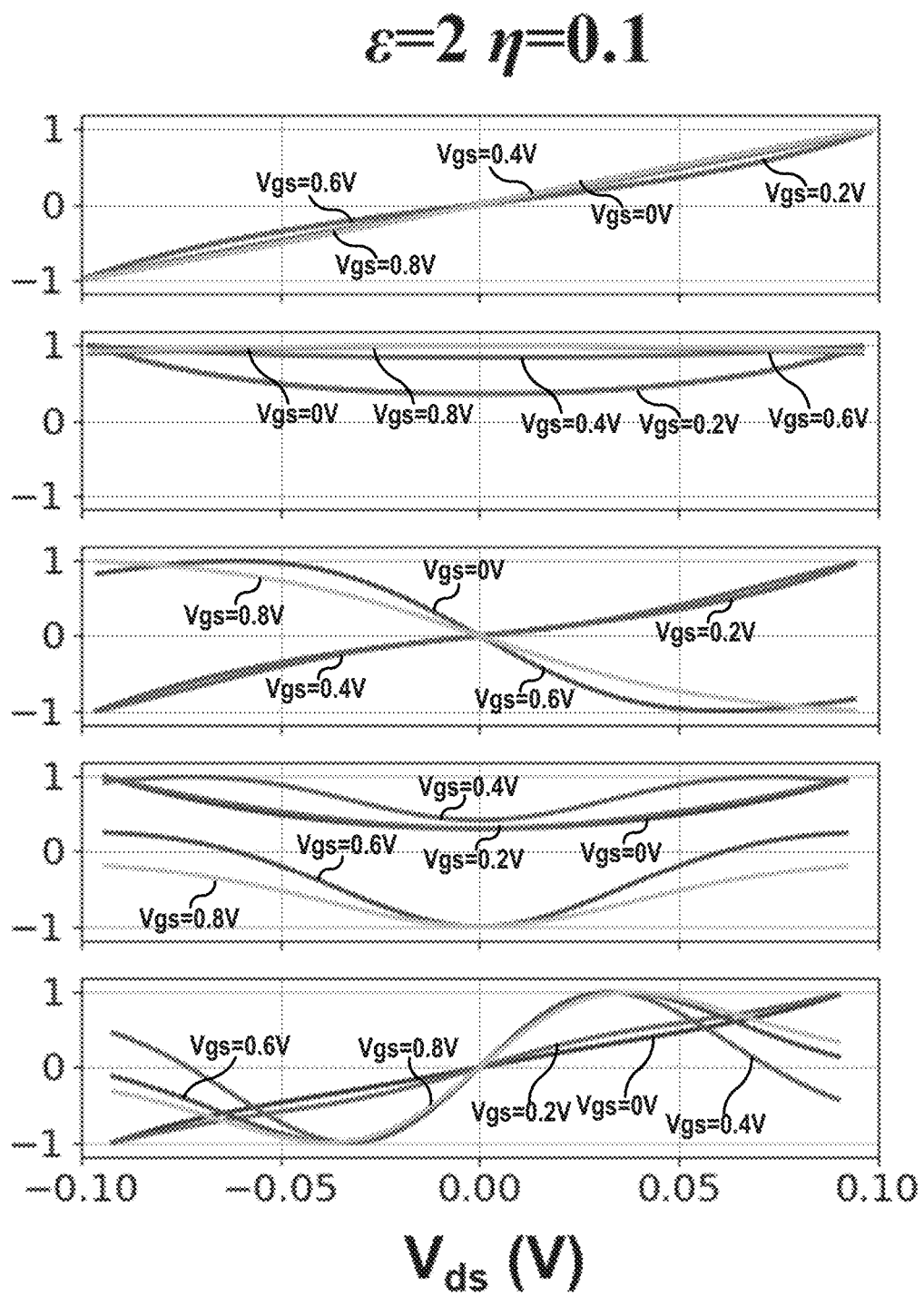

FIGS. 4A and 4B are graphs illustrating the results for the ANN I-V model, computed by a trained neural network according to some embodiments of the present disclosure. FIG. 4A illustrates the results of the ANN I-V model without the voltage smoothing functions (i.e., $V_{ds\_sm}=V_{ds}$ and $V_{gs\_sm}=V_{gs}$). FIG. 4B illustrates the results of the ANN I-V model with $\epsilon$=2 and $\eta$=0.1 for the voltage smoothing functions. The normalized derivatives of $I_{ds}$ with respect to $V_{ds}$ are shown up to the $4^{th}$ order. FIGS. 4A and 4B illustrate that by introducing the voltage smoothing functions and setting $\epsilon$=2 and $\eta$=0.1 (FIG. 4B), the ANN model can provide smooth derivatives of $I_{ds}$ with respect to $V_{ds}$ to at least the $4^{th}$ order, implying a significant improvement of the GST results over the case without voltage smoothing (FIG. 4A). It has been confirmed that the subthreshold current (e.g., at $V_{gs}$=0.1V) from the ANN model has a monotonic dependence on $V_{ds}$ with $\epsilon$=2 and $\eta$=0.1.

Figure 5A:
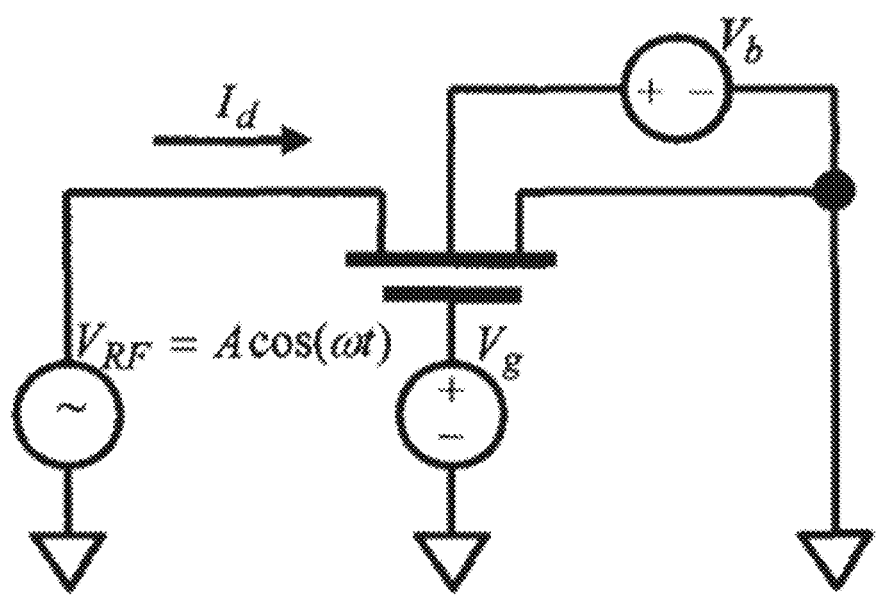
FIGS. 5A to 5C illustrate the performance of the ANN I-V model in harmonic balance simulation results, as computed by a trained neural network according to some embodiments of the present disclosure.
Figure 5B:
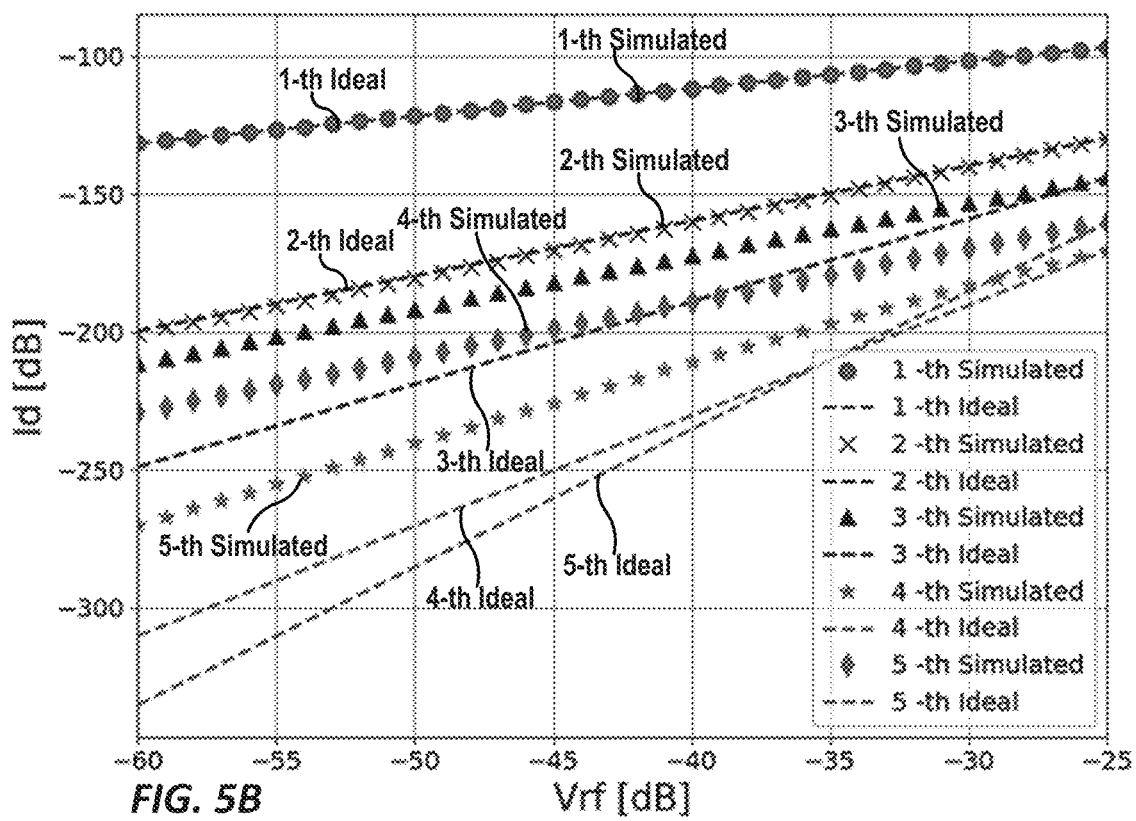
Figure 5C:
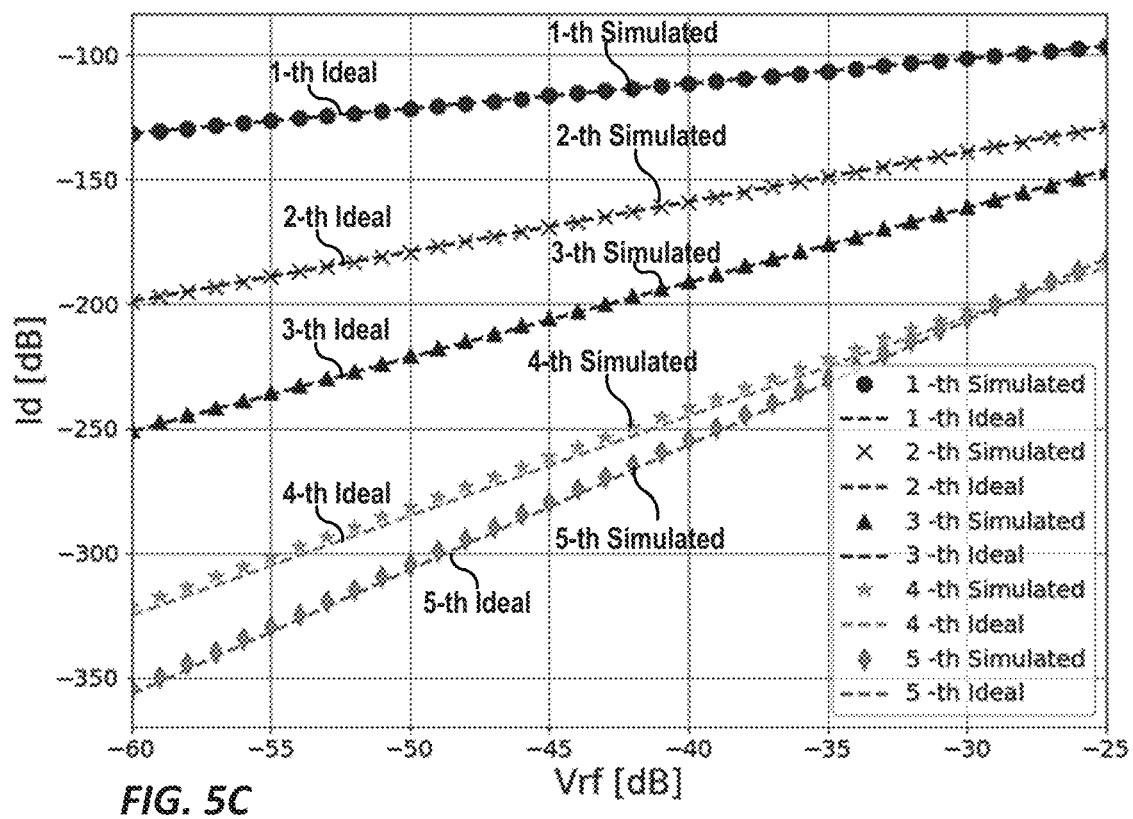

FIGS. 5A to 5C illustrate the performance of the ANN I-V model in harmonic balance simulation results, as computed by a trained neural network according to some embodiments of the present disclosure.

FIG. 5A is a schematic diagram of a test circuit utilized for performance of a harmonic balance (HB) HSPICE simulation. For the simulation, $V_g$ was 0.8V, $V_s$ and $V_b$ were 0V. $V_{rf}$ had an amplitude of 1 mV to 50 mV with a DC offset of 0. $V_d$ was set equal to $V_{rf}$. FIGS. 5B and 5C are graphs of results of the simulation. In FIG. 5B, the smoothed $V_{ds}$ and $V_{gs}$ techniques described herein were not utilized in the neural network whose results are illustrated. In FIG. 5C, $V_{ds}$ and $V_{gs}$ smoothing was performed (with $\epsilon$=2, $\eta$=0.1) in generated the neural network. Referring to FIG. 5B, without $V_{ds}$ and $V_{gs}$ smoothing, the highest order of harmonic that favorably compares with ideal $I_d$-$V_{rf}$ slopes is the second harmonic. As shown in FIG. 5C, the use of $V_{ds}$ and $V_{gs}$ smoothing can provide $I_d$-$V_{rf}$ slopes that favorably compare with ideal slopes up to the fifth harmonic. This beneficial performance can be important for RF distortion analyses.

It should be noted that the voltage smoothing functions mentioned above may be applied to the I-V ANN model, rather than the Q-V ANN model. Otherwise, the C-V characteristics of the ANN model may be distorted to such an extent that makes it difficult to fit the target C-V data.

ANN Model for FET Q-V (C-V) Characteristics

In transient circuit simulation, a transistor compact model may provide the terminal charges (e.g., $Q_g$, $Q_d$, $Q_s$) of the device at each given voltage bias. However, the Q-V data may not be directly available from TCAD simulation or hardware measurements; instead, the C-V data may be used for Q-V model calibration. For the LUT based models, a method to compute the terminal charges by integrating the C-V data over the $V_{ds}$ and $V_{gs}$ space has been previously proposed. However, the computed integrals depend on the integration path, so the proposed methods may result in errors for certain bias conditions. The present disclosure illustrates that the calibration of ANN-based Q-V models can be well conducted by using the C-V data, which is a significant advantage of ANN models according to embodiments of the present disclosure over LUT based models.

FIGS. 6A, 6B, 6C, 6D, 6E, and 6F are graphs illustrating ANN model results for the Q-V and C-V characteristics of an advanced n-type FET, computed by a trained neural network according to some embodiments of the present disclosure. The target data are shown by circles and the curves computed by the trained neural network are shown as lines of corresponding shade. The d1 and d2 values used in the loss function (see Equation 1) calculation are listed for each case. FIG. 6A is a graph illustrating $Q_g$ vs. $V_{gs}$ (d1=0.5, d2=0.25), according to some embodiments of the present disclosure. FIG. 6B is a graph illustrating $C_{gg}$ (=$dQ_g/dV_{gs}$) vs. $V_{gs}$ (d1=0.5, d2=0.25), according to some embodiments of the present disclosure. FIG. 6C is a graph illustrating $Q_g$ vs. $V_{gs}$ (d1=1.0, d2=0.5), according to some embodiments of the present disclosure. FIG. 6D is a graph illustrating $C_{gg}$ (=$dQ_g/dV_{gs}$) vs. $V_{gs}$ (d1=1.0, d2=0.5), according to some embodiments of the present disclosure. FIG. 6E is a graph illustrating $C_{gd}$ (=$dQ_g/dV_{ds}$) vs. $V_{ds}$ (d1=1.0, d2=0.5), according to some embodiments of the present disclosure.

FIG. 6F is a graph illustrating $C_{dd}$ (=$dQ_d/dV_s$) vs. $V_{ds}$ (d1=1.0, d2=0.5), according to some embodiments of the present disclosure.

For comparison purposes, the targets illustrated in FIGS. 6A to 6F are generated from a BSIM-CMG model, so that the Q and C values are consistent. The described embodiments initially set d1=0.5 and d2=0.25 for the loss function (see Equation 1) calculation. By doing so, both the Q (e.g., $Q_g$) targets and the C (e.g., $C_{gg}$, $C_{gd}$) targets are used for training the Q-V ANN model of the embodiments of the present disclosure. As shown in FIGS. 6A and 6B, the obtained ANN model according to embodiments of the present disclosure can well fit both the $Q_g$-$V_{gs}$ and $C_{gg}$-$V_{gs}$ targets in this case. Next, by setting d1=1.0 and d2=0.5, the Q targets are excluded from the loss function calculation (i.e., the err($M^{(i)}$) terms in Equation 1 becomes zero). FIGS. 6D, 6E, and 6F show that the trained ANN model according to embodiments of the present disclosure with this setting can accurately capture the C-V characteristics of the device, while the Q values from this model may have a constant offset from the Q targets. From a circuit simulation perspective, what affects the simulation outcome is the derivatives of the device terminal charges with respect to voltage biases, not the charge values themselves. (This has been verified by ring oscillator (RO) simulations, to be described herein.) Hence, it can be concluded that by adopting the loss function in Equation 1 and setting d1=1.0 (0<d2<d1), the training of a Q-V ANN model can be well conducted with C-V data only, which can be directly obtained from TCAD simulation or hardware measurements.

Ring Oscillator Simulation

Figure 7A:
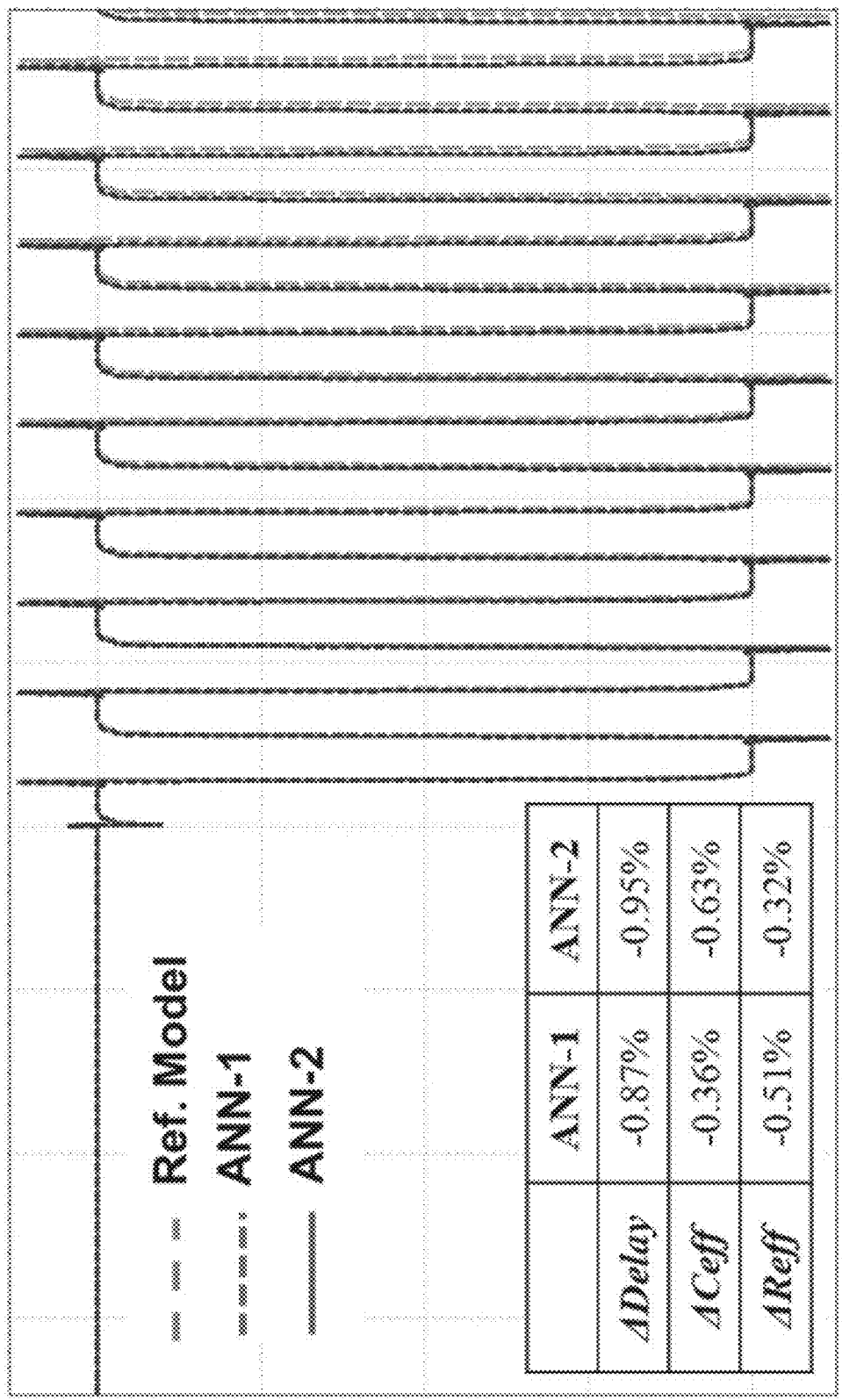
FIGS. 7A and 7B are graphs illustrating the performance of models trained using C-V data according to some embodiments of the present disclosure as compared to models trained using Q-V data.
Figure 7B:
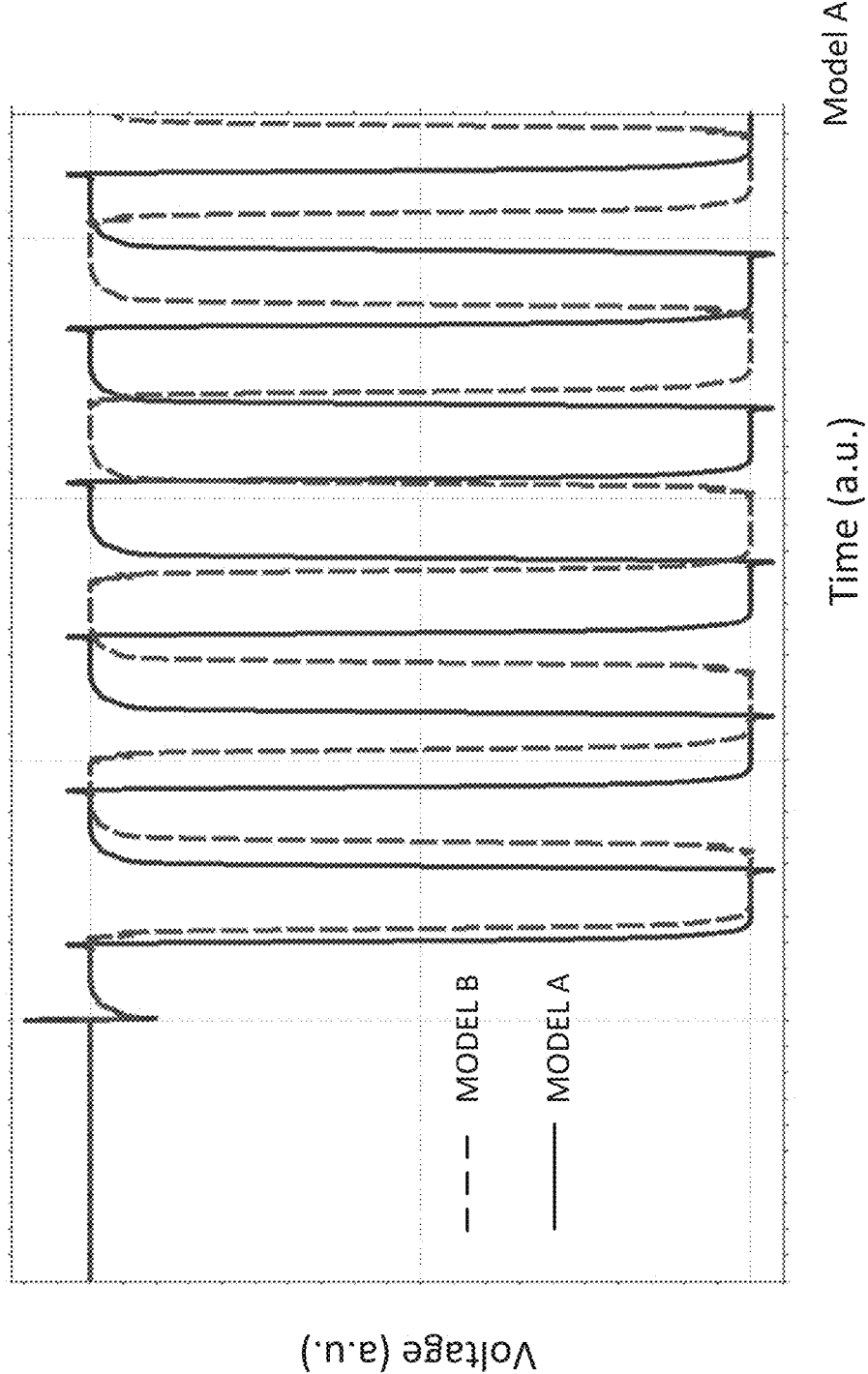

After the training of the ANN I-V and Q-V models, the ANN weights (e.g., W1, b1, W2, b2, W3, b3 as shown in FIG. 1B) can be converted into a Verilog-A model for circuit simulation. (This process may be automated by using a Python script.) FIGS. 7A and 7B are graphs illustrating the performance of models trained using C-V data according to some embodiments of the present disclosure as compared to models trained using Q data. FIG. 7A illustrates the voltage waveforms of a 17-stage RO simulated using the reference BSIM-CMG models, as well as the ANN models, computed by a trained neural network according to some embodiments of the present disclosure. In FIG. 7A, the BSIM-CMG models are illustrated with a dashed line, the ANN-1 models are illustrated by a dotted line, and the ANN-2 models are illustrated with a solid line. Key circuit metrics such as RO Delay, $C_{eff}$ (effective capacitance), and $R_{eff}$ (effective resistance) are extracted from the simulation results, and the differences between the ANN model results and the reference are summarized in the inset table of FIG. 7A. The I-V and Q-V target data of both NFET and PFET are generated from the reference models, and the ANN I-V and Q-V models are trained with the relevant target data. The difference between the ANN-1 and ANN-2 models illustrated in FIG. 7A is that the Q-V models in ANN-1 are trained according to embodiments of the present disclosure with the inclusion of the Q values in the loss function (d1=0.5, d2=0.25), while those in ANN-2 are trained according to embodiments of the present disclosure with the C-V data only (d1=1.0, d2=0.5). The results show that the ANN models offer very high accuracy for RO simulations (i.e., less than 1% error for Delay, $C_{eff}$ and $R_{eff}$) as compared with the reference models, and ANN-2, with the Q-V models trained with C-V data only, performs equally well as ANN-1.

FIG. 7B illustrates the errors that can be caused by charge integration in models that utilize Q-V data for training. In FIG. 7B, Model A is a Q-V NN model trained with C-V data directly. Model B is a Q-V NN model trained with Q-V data integrated from the C-V data. (A LUT-based Q-V model provides very similar results to Model B.) In FIG. 7B, Model A is illustrated with a solid line and Model B is illustrated with a dashed line. Key circuit metrics such as RO Delay, $C_{eff}$ (effective capacitance), and $R_{eff}$ (effective resistance) are extracted from the simulation results, and the differences between the ANN model results are summarized in the inset table of FIG. 7B. The results show that Model A trained according to C-V data has improvements over Model B (the Q-V-trained NN model) in each of the categories. For example, Model B shows a 16.2% increase in Delay, a 17.9% increase in $C_{eff}$ and a 1.2% decrease in $R_{eff}$) as compared with Model A.

Advanced Features

Additional elements may be introduced to the ANN-based compact modeling methodology for improving the model capability and the model creation (i.e., ANN training) efficiency.

Initial Weights Setting for Training TAT Improvement

For ANN training, the initial ANN weights (i.e., $W_i$, $b_i$) are usually assigned to random numbers generation from a certain distribution, and their values are then adjusted gradually during the learning process to minimize the loss function value. In the practice of compact model development, it may be possible that a model fitted to a device with similar characteristics is already available before the model parameter extraction is conducted. In this case, using a pre-fitted model as a start model may effectively speed up the parameter extraction process. In some embodiments of the present disclosure, this idea may be applied in the context of ANN based compact modeling, by introducing an option to load a pre-trained ANN model as the initial weights for the ANN training process.

Figures 8A, 8B:
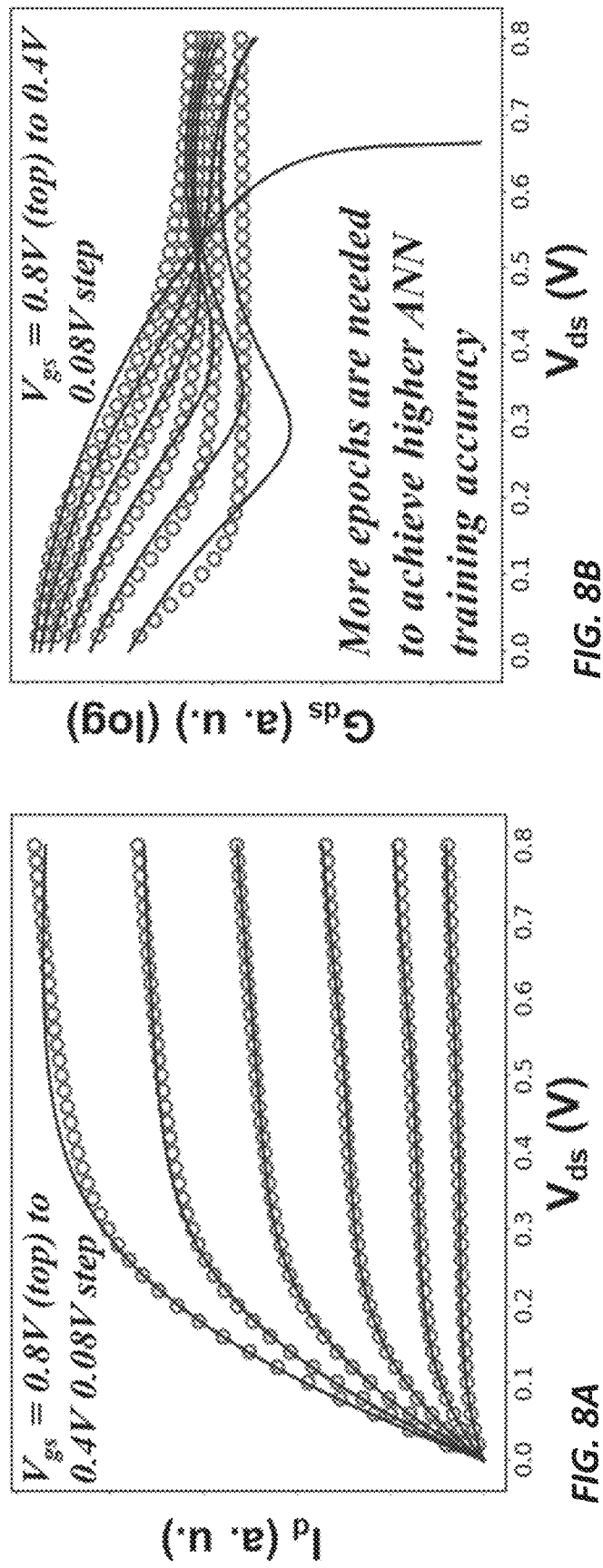
FIGS. 8A, 8B, 8C, and 8D are graphs illustrating an example of using a start model as the initial ANN weights to expedite the ANN training, according to some embodiments of the present disclosure.
Figures 8C, 8D:
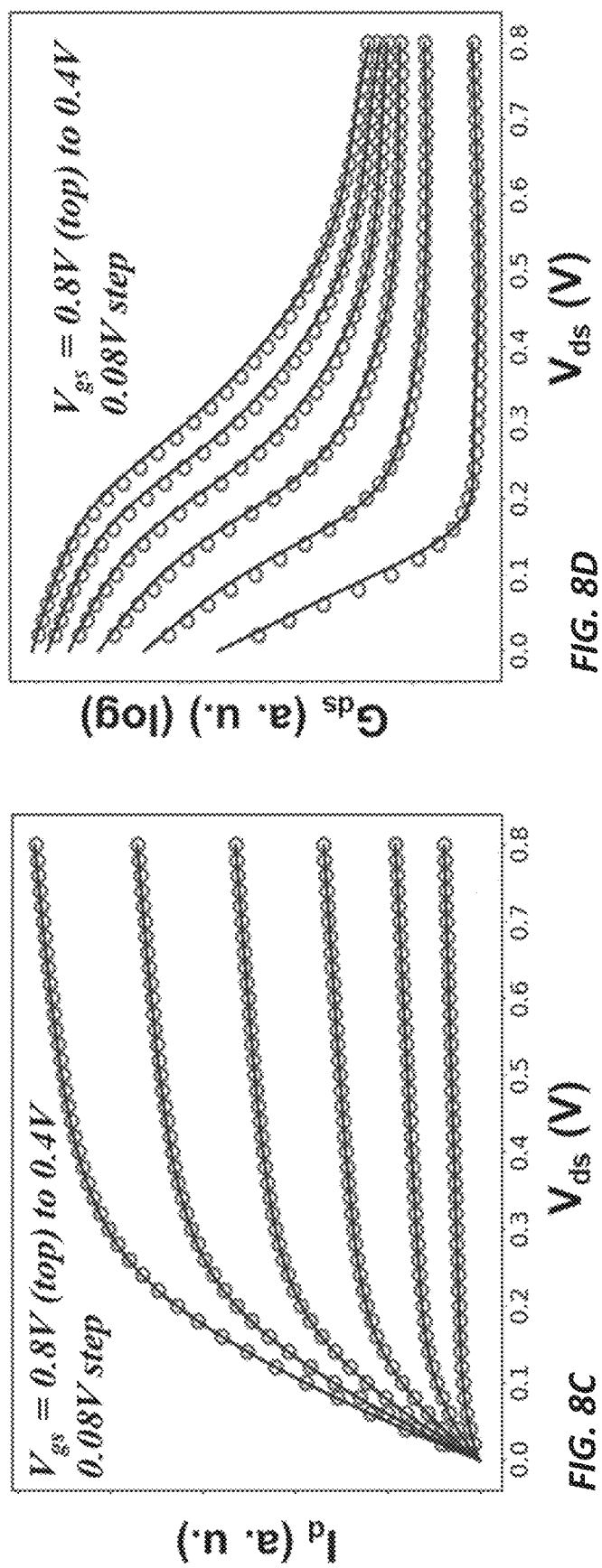

FIGS. 8A, 8B, 8C, and 8D are graphs illustrating an example of using a start model as the initial ANN weights to expedite the ANN training, according to some embodiments of the present disclosure. FIGS. 8A to 8D illustrate ANN model results (lines) vs. targets (circles) for $I_d$ vs. $V_{ds}$ and $G_{ds}$ vs. $V_{ds}$ characteristics of an advanced n-type FET. The ANN models are trained with two different settings: Case I with randomized initial ANN weights (FIGS. 8A and 8B) and Case II where the initial ANN weights are set based on a start model (8C and 8D). The ANN training has stopped after 5,000 epochs in both cases. The results in FIG. 8B show that the obtained ANN model displays substantial errors for $G_{ds}$ fitting, implying that more training epochs are needed to achieve better model accuracy. In Case II (FIGS. 8C and 8D), the initial ANN weights were set by using a start model, which has been fitted to a device with similar I-V characteristics as the device to be modeled (e.g., threshold voltage $V_{th}$ and on current at turn on $I_{on}$ differences between the two devices are ~80 mV and ~20%, respectively). After running 5,000 epochs, the trained ANN model according to some embodiments of the present disclosure in this case shows high fitting accuracy for both $I_d$ (FIG. 8C) and $G_{ds}$ (FIG. 8D), a significant improvement over Case I. (If randomized initial ANN weights are used, about 200,000 to 500,000 epochs are needed to achieve the same level of model accuracy as in Case II, implying that choosing a proper start ANN model may help improve the ANN training efficiency by ~40-100×.) In DTCO activities, gradual updates on device characteristics from run to run are mostly expected. Therefore, the ANN training efficiency according to some embodiments of the present disclosure may be greatly improved by adopting an early version of the ANN model as the start model for initial ANN weights setting.

Global Fitting vs. Local Fitting

When creating compact models for multiple device instances (e.g., W, L and T), two schemes can be used: 1) generating one single model that fits the data for all device instances (so called global fitting), and 2) creating a separate model for each device instance (so called local fitting). For global fitting, the input data may include both instance (e.g., W, L, T, etc.) data as well as bias ($V_{gs}$, $V_{ds}$, etc.) data. For local fitting, the input data may include bias ($V_{gs}$, $V_{ds}$, etc.) data only (e.g., instance data defining the device instance is pre-set). Global fitting vs. local fitting schemes are compared herein in the context of ANN model generation and simulation according to some embodiments of the present disclosure.

Table I summarizes the global fitting vs. local fitting comparison results for a test case with 36 device instances (i.e., W/L/T).

TABLE I

AN EXAMPLE OF GLOBAL FITTING VS. LOCAL FITTING
(36 DEVICE INSTANCES, W/L/T, TO BE FITTED)

|  | Global Fitting | Local Fitting |
|---|---|---|
| No. of ANN Models | 1 (a single ANN model for all 36 device instances) | 36 (one separate ANN model for each device instance) |
| ANN Size | N1 = 20, N2 = 15 | N1 = 10, N2 = 5 |
| TAT per Epoch (PyTorch) | ~0.015 sec. | ~0.004 sec. |
| No. of Epochs Needed | ~2,000,000 | ~50,000 |
| Total Training TAT | ~8 hours | ~200 sec. (per model), ~2 hours for all 36 models (sequentially trained), can be parallelized |
| SPICE Simulation TAT | ~5x | 1x (reference) |

To achieve the same level of model accuracy, the ANN size of the global model (i.e., N1=20, N2=15) may be larger than that of a local model (i.e., N1=10, N2=5), simply because more tunable parameters (i.e., ANN weights) are used to fit the data of all device instances rather than just one. The larger ANN size and the larger number of training samples (e.g., 36x) for the global fitting may lead to a significantly longer training TAT per epoch than the local fitting (i.e., 0.015 seconds vs. 0.004 seconds, by using PyTorch). In addition, more epochs are used in ANN training for the global fitting, since it takes more iterations to train a larger ANN with more training samples. For these reasons, the total training TAT for the global model (i.e., ~8 hours) is substantially larger than that of the local models (i.e., ~2 hours if training all 36 local models sequentially. As the training of different local models is independent, local model training can be further expedited by running the multiple (e.g., 36) jobs in parallel, if the computational resources permit.

Finally, results show that the SPICE simulation TAT for the global model is ~5x of that for a local model, as the SPICE simulation TAT of an ANN model strongly depends on the ANN size, which will be described further herein. Based on these results, it may be concluded that using a local fitting scheme is beneficial for ANN based modeling according to some embodiments of the present disclosure, which can offer a significantly better ANN training TAT and a faster SPICE simulation TAT than the global fitting scheme.

SPICE Simulation TAT as a Function of ANN Size

Computational efficiency of a compact model will directly impact the circuit (SPICE) simulation TAT. Therefore, it is important to measure the SPICE simulation TAT of some benchmark circuits when developing new compact models. In an ANN model according to some embodiments of the present disclosure, the number of computations (e.g., multiplications, activation function evaluations) are determined by the ANN size, as measured by the number of hidden layers (NHL) and the number of neurons in each hidden layer. In general, a larger ANN may offer a higher fitting capability due to its larger number of fitting parameters (i.e., ANN weights). On the other hand, a larger ANN size is expected to degrade the SPICE simulation TAT. A study to explore the quantitative dependence of the SPICE simulation TAT on the ANN size is described herein, and a guideline is provided for generating an improved ANN model with the consideration of both model accuracy and SPICE simulation TAT.

Although in principle NHL is an adjustable ANN setting, the inventors have discovered that $N_{HL}=2$ may be preferred because when $N_{HL}>2$, the ANN model may suffer larger training and SPICE simulation TATs, while when $N_{HL}=1$, the fitting capability of the ANN model may be degraded. For this reason, the present disclosure focuses on ANN models with two hidden layers, though the embodiments of the present disclosure are not limited thereto. Five ANN models according to some embodiments of the present disclosure having various numbers of neurons (i.e., N1/N2=15/10, 10/10, 10/5, 5/5, 3/3) were created, and SPICE simulations of a 17-stage RO circuit were performed with each ANN model option. To represent the ANN size quantitatively, three ANN Size Indicators (ASIs) were introduced, based on the number of ANN weights (ASI-W), as well as the number of multiplications (ASI-M) and the number of activation function evaluations (ASI-A) in one ANN model inference.

Figure 9:
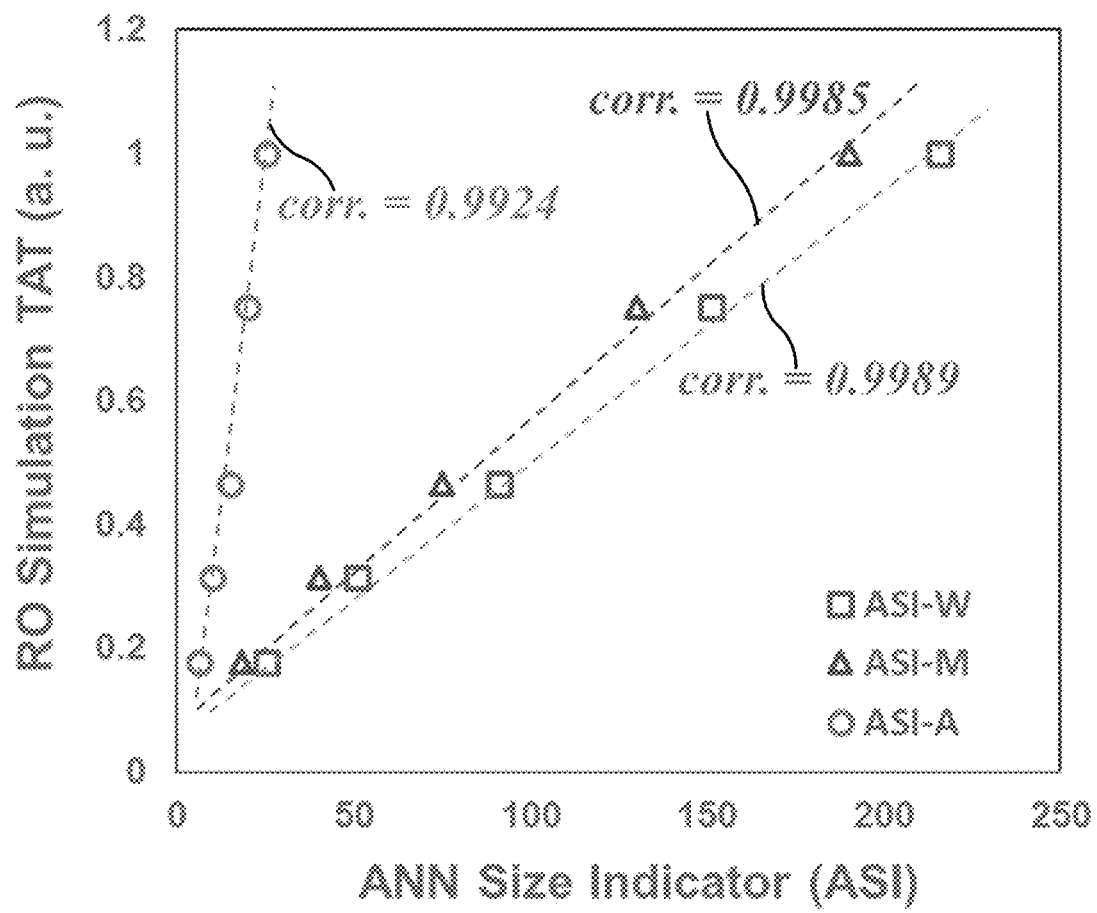
FIG. 9 is a graph of a SPICE simulation TAT for a 17-stage RO vs. ANN Size Indicators (ASIs), according to some embodiments of the present disclosure.

FIG. 9 is a graph of a SPICE simulation TAT for a 17-stage RO vs. ASIs, according to some embodiments of the present disclosure. FIG. 9 plots the normalized SPICE simulation TATs for the RO vs. the three ASIs. The definition and the formula for each ASI are summarized in the inset table. Here $N_i$, $N_1$, $N_2$ and $N_o$ are for the number of neurons in the input layer, the 1st hidden layer, the 2nd hidden layer and the output layer of the ANN, respectively. The correlation coefficients between the RO simulation TAT and each ASI are shown in the plot. Referring to FIG. 9, the RO simulation TAT has a nearly perfect correlation with all three indicators, implying that these ASI indicators are effective for estimating the SPICE simulation TAT as a function of ANN sizes, without the need of conducting the actual ANN model training and SPICE simulation. (In some embodiments, the memory usage of the RO SPICE simulation is found insensitive to the ANN model size.)

To investigate the impact of the ANN size on model accuracy, the simulated RO delays from the five ANN model options according to some embodiments of the present disclosure with that from the reference model were compared. A less than 0.5% error is achieved for all cases except the one with the smallest ANN size (N1=3, N2=3), which leads to a 1.4% error. In practice, once a model accuracy target is determined, there should exist an ANN size that can be used to deliver a sufficiently accurate ANN model with the best possible SPICE simulation TAT.

Comparison with Other Compact Model Types

Table II presents a comparison of the key properties of ANN based FET models computed by a trained neural network according to some embodiments of the present disclosure with those of the standard, physical equation-based FET models as well as LUT models.

TABLE II

COMPARISON AMONG ANN, STANDARD AND LUT MODELS

| | Standard | LUT | ANN |
|---|---|---|---|
| Model Equation Creation | long TAT, expertise needed | no need | no need |
| Model Parameter Extraction | long TAT, expertise needed[a] | no need | short TAT, fully automated |
| Data Requirement | medium | very high | high |
| Variability Modeling Capability | high | low | medium |
| SPICE simulation TAT | fast | slow | medium[b] |

[a]It may be automated to some extent, but it can be challenging to obtain very high model accuracy with a fully automated flow.
[b]It may be further improved by converting the Verilog-A based ANN models into hand-coded C code.

The ANN model according to some embodiments of the present disclosure is at an advantage over the LUT counterpart in most aspects, except for its modest overhead in model parameter extraction (i.e., ANN training). Additionally, the results described herein indicate that ANN models according to some embodiments of the present disclosure may offer higher Q-V model accuracy than LUTs. For these reasons, it can be concluded that an ANN trained according to some embodiments of the present disclosure is a superior option to LUT for data-based compact modeling, given that the hardware and software infrastructure for ANN training is available.

As compared with the standard FET models, ANN models trained according to some embodiments of the present disclosure hold an apparent advantage in the efficiency of model equation creation and parameter extraction, while the standard models offer a faster SPICE simulation TAT, a higher capability for variability modeling, and less data requirement due to their physics-based nature. For this reason, ANN based FET models trained according to some embodiments of the present disclosure may find their superiority in advanced DTCO and pathfinding activities, due to their excellent model generation efficiency and fitting capabilities.

Figure 10:
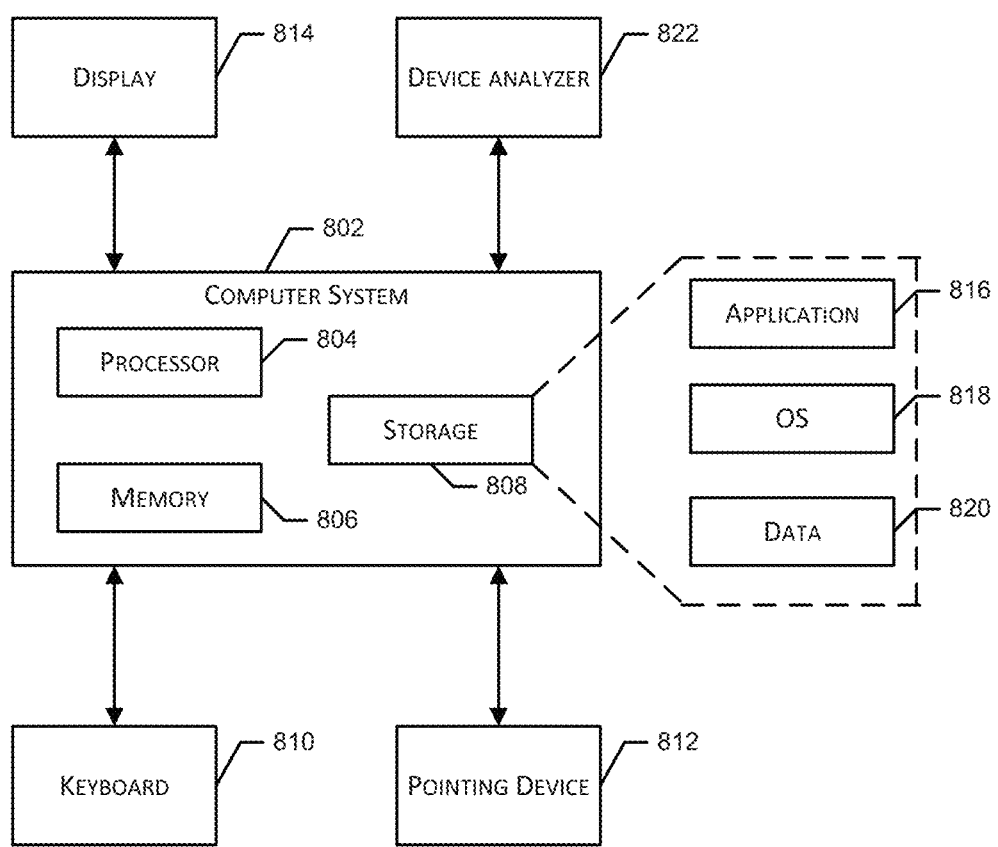
FIG. 10 illustrates a computer system in accordance with some embodiments of the present disclosure.

Reference is now made to FIG. 10, which illustrates a computer system in accordance with some embodiments described herein. A computer or a computer system can generally be any system that can perform computations. Specifically, a computer system can be a microprocessor, an application specific integrated circuit, a distributed computing system, a cloud computing system, or any other computing system now known or later developed. In some embodiments, computer system 802 includes processor 804, memory 806, and storage 808. Computer system 802 can be coupled with display 814, keyboard 810, pointing device 812, and device analyzer 822. Storage 808 can generally be any device that can store data. Specifically, a storage device can be a magnetic, an optical, and/or a magneto-optical storage device, and/or it can be based on flash memory and/or battery-backed up memory. Storage 808 can store application 816, operating system 818, and data 820.

Application 816 can include instructions that when executed by computer system 802 cause computer system 802 to perform one or more processes that are implicitly or explicitly described in this disclosure. Data 820 can include any data that is input into or output by application 816. For example, the data 820 may include a technology computer-aided design data set corresponding to nominal performance of a semiconductor device. In some embodiments, such data is received from a device analyzer 822 and may be related to a manufactured device.

In some embodiments, the processor 804 may execute the application 816 to train an ANN according to embodiments of the present disclosure based on the data 820. In some embodiments, the data 820 and/or application 816 may include an ANN trained according to embodiments of the present disclosure, and the processor 804 may utilize the ANN to provide output estimating a transistor's performance based on methods described herein.

An ANN based compact modeling methodology for advanced FET modeling has been described herein according to embodiments of the present disclosure. The described results show that ANN based FET models well reproduce the I-V and C-V characteristics of the modeled devices, and the SPICE simulation results based on the ANN models match the RO delay target with a less than 1% error. The capabilities of ANN models for model re-targeting and variability modeling have been extended, and several key techniques for improving ANN training TAT and SPICE simulation TAT have been introduced. The impact of the ANN size on ANN model accuracy and SPICE simulation TAT has also been described, and an automated flow for generating optimum ANN models has been proposed. According to the embodiments of the present disclosure, the ANN based compact modeling methodology shows promises for advanced DTCO and pathfinding activities.

As shown above, embodiments disclosed herein may provide computational efficiency over conventional methods of analyzing and/or designing semiconductor devices and/or electrical circuits including semiconductor devices by providing an improved ANN-based model for considering process variations based on C-V data.

Embodiments of the present disclosure have been described above with reference to the accompanying drawings, in which example embodiments are shown. The inventive concepts may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the drawings and specification. As used herein the expression "and/or" includes any and all combinations of one or more of the associated listed items.

It will be understood that when an element is referred to as being "coupled to" or "connected to" or "on" another element, it can be directly coupled to, connected to or on the other element or intervening elements may also be present. In contrast, when an element is referred to as being "directly coupled to" or "directly connected to" or "directly on" another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, elements, and/or components, but do not preclude the presence or addition of one or more other features, elements, components, and/or groups thereof.

Various embodiments of the present invention are described above with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general-purpose computer, special purpose computer, Application Specific Integrated Circuits (ASIC), and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

It will be further appreciated that the functionality described herein may be embodied, at least in part, using discrete hardware components, one or more ASIC and/or one or more special purpose digital processors and/or computers.

All embodiments can be combined in any way and/or combination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

What is claimed is:

1. A computer implemented method for analyzing performance of a semiconductor device, the method comprising:
    providing training data comprising input state values and training capacitance values to a neural network executing on a computer system;
    processing the input state values through the neural network to generate modeled charge values;
    converting the modeled charge values to modeled capacitance values;
    determining, by the computer system, whether the training capacitance values of the training data are within a threshold value of the modeled capacitance values utilizing a loss function that omits the modeled charge values;
    in response to determining that the training capacitance values of the training data are within the threshold value of the modeled capacitance values, converting, by the computer system, the neural network to a circuit simulation code to generate a converted neural network;
    using the converted neural network to simulate behavior of a test semiconductor device to generate simulation output;
    determining, by the computer system, whether a turnaround time of the generation of the simulation output is satisfactory; and
    in response to determining that the turnaround time is not satisfactory, decreasing, by the computer system, the size of the neural network and repeating the processing of the input state values through the neural network.

2. The computer implemented method of claim 1, further comprising, in response to determining that the training capacitance values of the training data are not within the threshold value of the modeled capacitance values, adjusting, by the computer system, a parameter of the neural network and repeating the processing of the input state values through the neural network.

3. The computer implemented method of claim 1, wherein adjusting, by the computer system, a parameter of the neural network includes increasing a size of the neural network.

4. The computer implemented method of claim 1, wherein the semiconductor device is a transistor.

5. The computer implemented method of claim 1, wherein the input state values comprise a plurality of bias values and a plurality of instance values, and
    wherein the computer implemented method further comprises:
    for each instance value of the plurality of instance values, generating an additional neural network by holding the instance value constant and providing the plurality of bias values to the additional neural network as the input state values for the additional neural network.

6. The computer implemented method of claim 1, further comprising:
    manufacturing a first instance of the semiconductor device;
    measuring characteristics and/or performance of the first instance of the semiconductor device; and
    generating the training data based on the measured characteristics and/or performance of the first instance of the semiconductor device.

7. The computer implemented method of claim 6, further comprising:
    building a hardware description language (HDL) model based on the converted neural network; and
    manufacturing a second instance of the semiconductor device based on the HDL model.

8. The computer implemented method of claim 1, wherein converting the modeled charge values to modeled capacitance values comprises generating a mathematical derivative of the modeled charge values.

9. The computer implemented method of claim 1, wherein the training capacitance values of the training data are generated by a technology computer aided design (TCAD) system simulation.

10. The computer implemented method of claim 9, wherein providing the training data is performed without performing a mathematical integration of the training capacitance values.

11. A system for analyzing performance of a semiconductor device, the system comprising:
    a processor; and
    a memory that stores computer readable code that, when executed, causes the processor to perform operations comprising:
    providing training data comprising input state values and training capacitance values to a neural network executing on a computer system;
    processing the input state values through the neural network to generate modeled charge values;
    converting the modeled charge values to modeled capacitance values;
    determining, by the computer system, whether the training capacitance values of the training data are within a threshold value of the modeled capacitance values utilizing a loss function that omits the modeled charge values;

in response to determining that the training capacitance values of the training data are within the threshold value of the modeled capacitance values, converting, by the computer system, the neural network to a circuit simulation code to generate a converted neural network;

using the converted neural network to simulate behavior of a test semiconductor device to generate simulation output;

determining, by the computer system, whether a turnaround time of the generation of the simulation output is satisfactory; and in response to determining that the turnaround time is not satisfactory, decreasing, by the computer system, the size of the neural network and repeating the processing of the input state values through the neural network.

12. The system of claim 11, wherein the operations further comprise, in response to determining that the training capacitance values of the training data are not within the threshold value of the modeled capacitance values, adjusting, by the processor, a parameter of the neural network and repeating the processing of the input state values through the neural network.

13. The system of claim 11, wherein adjusting, by the computer system, a parameter of the neural network includes increasing a size of the neural network.

14. The system of claim 11, wherein the input state values comprise a plurality of bias values and a plurality of instance values, and
wherein the operations further comprise:
for each instance value of the plurality of instance values, generating an additional neural network by holding the instance value constant and providing the plurality of bias values to the additional neural network as the input state values for the additional neural network.

15. The system of claim 11, wherein the operations further comprise:
manufacturing a first instance of the semiconductor device;
measuring characteristics and/or performance of the first instance of the semiconductor device; and
generating the training data based on the measured characteristics and/or performance of the first instance of the semiconductor device.

16. The system of claim 15, wherein the operations further comprise:
building a hardware description language (HDL) model based on the converted neural network; and
manufacturing a second instance of the semiconductor device based on the HDL model.

17. The system of claim 11, wherein converting the modeled charge values to modeled capacitance values comprises generating a mathematical derivative of the modeled charge values.

18. The system of claim 11, wherein the training capacitance values of the training data are generated by a technology computer aided design (TCAD) system simulation.

19. The system of claim 18, wherein providing the training data is performed without performing a mathematical integration of the training capacitance values.

20. A computer program product, comprising:
a non-transitory computer readable storage medium storing computer readable program code that, when executed by a processor of an electronic device, causes the processor to perform operations comprising:
providing training data comprising input state values and training capacitance values to a neural network executing on a computer system;
processing the input state values through the neural network to generate modeled charge values;
converting the modeled charge values to modeled capacitance values;
determining, by the computer system, whether the training capacitance values of the training data are within a threshold value of the modeled capacitance values utilizing a loss function that omits the modeled charge values;
in response to determining that the training capacitance values of the training data are within the threshold value of the modeled capacitance values, converting, by the computer system, the neural network to a circuit simulation code to generate a converted neural network;
using the converted neural network to simulate behavior of a test semiconductor device to generate simulation output;
determining, by the computer system, whether a turnaround time of the generation of the simulation output is satisfactory; and
in response to determining that the turnaround time is not satisfactory, decreasing, by the computer system, the size of the neural network and repeating the processing of the input state values through the neural network.

* * * * *